United States Patent
Gold et al.

(10) Patent No.: US 11,879,732 B2
(45) Date of Patent: Jan. 23, 2024

(54) METHODS OF MEASURING STRUCTURES

(71) Applicant: IKEGPS Group Limited, Wellington (NZ)

(72) Inventors: Jeremy James Gold, Wellington (NZ); Leon Mathieu Lammers van Toorenburg, Nederland, CO (US)

(73) Assignee: IKEGPS Group Limited, Wellington (NZ)

( * ) Notice: Subject to any disclaimer, the term of this patent is extended or adjusted under 35 U.S.C. 154(b) by 767 days.

(21) Appl. No.: 16/839,250

(22) Filed: Apr. 3, 2020

(65) Prior Publication Data
US 2020/0318962 A1  Oct. 8, 2020

(30) Foreign Application Priority Data
Apr. 5, 2019 (NZ) .......................... 752408

(51) Int. Cl.
*G01C 11/04* (2006.01)
*G01C 15/00* (2006.01)
*G01C 3/02* (2006.01)

(52) U.S. Cl.
CPC .............. *G01C 11/04* (2013.01); *G01C 3/02* (2013.01); *G01C 15/00* (2013.01)

(58) Field of Classification Search
None
See application file for complete search history.

(56) References Cited

U.S. PATENT DOCUMENTS

| | | | |
|---|---|---|---|
| 8,139,111 B2* | 3/2012 | Oldroyd | G06V 10/235 345/619 |
| 10,360,247 B2 | 7/2019 | Hebbaluguppe et al. | |
| 2002/0056501 A1 | 5/2002 | Bingel, III et al. | |
| 2003/0103651 A1* | 6/2003 | Novak | G01C 15/00 382/106 |
| 2007/0008515 A1* | 1/2007 | Otani | G01C 11/00 382/106 |
| 2014/0132723 A1 | 5/2014 | More | |
| 2017/0358068 A1 | 12/2017 | Strebel et al. | |

(Continued)

FOREIGN PATENT DOCUMENTS

| | | |
|---|---|---|
| CN | 101592484 | 12/2009 |
| CN | 102506825 | 2/2014 |

(Continued)

*Primary Examiner* — Luke D Ratcliffe
(74) *Attorney, Agent, or Firm* — Merchant & Gould P.C.

(57) ABSTRACT

A method of measuring a structure includes acquiring azimuth and tilt readings at a first location and second location. Images of the structure are also acquired from the first and second location. The respective distances from the first and second locations to a first and second point on the structure are measured. A scale is established from two positions of the structure depicted in the first or second image of the structure. The distance between the first and second points on the structure is found using the established scale. This distance is used with the azimuth and tilt readings and measured distances from the first and second location to build an epipolar model of the structure. The structure may be a utility pole. Also disclosed are methods of assisting photogrammetric measurements and estimating the class of a utility pole, and methods of determining the compliance status of a utility pole.

10 Claims, 18 Drawing Sheets

(56) References Cited

U.S. PATENT DOCUMENTS

2018/0025458 A1   1/2018  Swamy
2019/0257644 A1*  8/2019  Hillebrand ............. G06V 20/64

FOREIGN PATENT DOCUMENTS

| CN | 104807449 | 7/2015 |
|---|---|---|
| IN | 201821006091 | 2/2018 |
| JP | 09097342 | 4/1997 |
| JP | 2000331041 | 11/2000 |
| JP | 2002024336 | 1/2002 |
| JP | 2003097946 | 4/2003 |
| JP | 2003202210 | 7/2003 |
| JP | 2004233233 | 8/2004 |
| JP | 4472618 | 3/2010 |
| JP | 2012048306 | 3/2012 |
| JP | 2019078589 | 5/2019 |
| JP | 2019175065 | 10/2019 |
| KR | 100780603 | 11/2007 |
| WO | 200282181 | 10/2002 |
| WO | 2016135856 | 9/2016 |
| WO | 201959091 | 3/2019 |

* cited by examiner

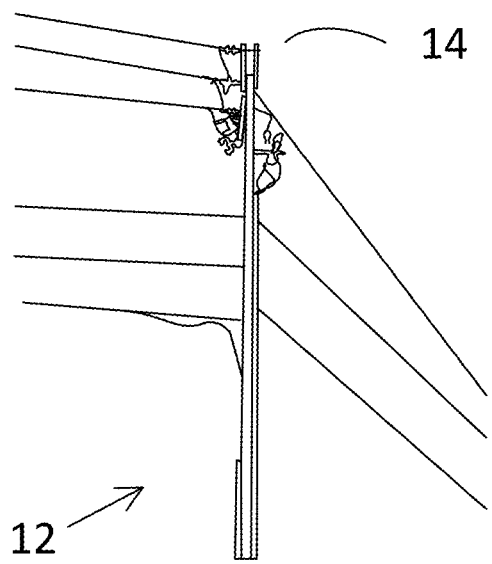
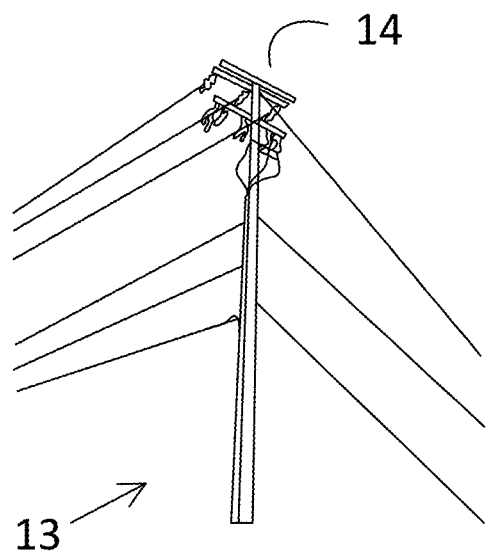
Figure 3a
Figure 3b
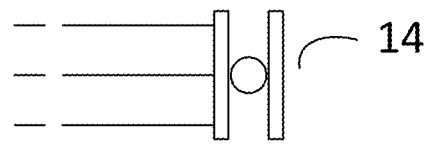
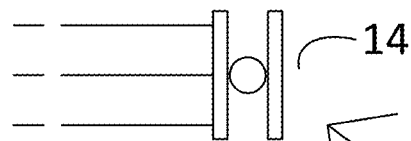
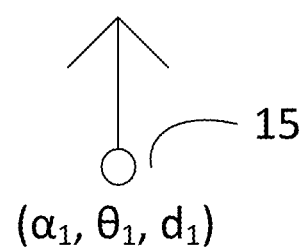
($\alpha_1$, $\theta_1$, $d_1$)
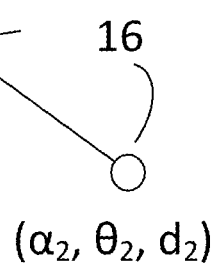
($\alpha_2$, $\theta_2$, $d_2$)
Figure 3c
Figure 3d

METHODS OF MEASURING STRUCTURES

CROSS SECTION TO RELATED APPLICATIONS

This application is claims benefit of Serial No. 752408, filed 5 Apr. 2020 in New Zealand, and which application is incorporated herein by reference. To the extent appropriate, a claim of priority is made to the above disclosed application.

FIELD

This invention relates to measurements of structures, such as utility poles, from digital images. This invention also relates the determining whether utility poles are in compliance with relevant rules.

BACKGROUND

Accurate measurements of structures, in particular items of infrastructure, are required by several agencies around the world. In particular, utility operators need to accurately survey utility poles to maintain a record of their utility pole stock. Utility pole owners and operators also need to ensure that their utility poles are compliant with local rules and regulations.

Existing methods used to accurately measure utility poles require cumbersome collections of equipment and skilled operators with significant expertise. Acquiring accurate measurements of utility poles takes significant time and resources at great expense.

Photogrammetric techniques used to measure utility poles typically require a photogrammetric operator to be present in the field. While measurements may be performed off-site once a suitable image has been taken, great expertise is required to capture an initial image and associated dataset. If the acquired image or associated data are acquired by an unskilled operator, the resulting measurements may be inaccurate.

SUMMARY

In some configurations, a method of photogrammetrically measuring a structure can comprise:
  acquiring an azimuth reading and a tilt reading at a first location;
  using a distance measuring device to measure the distance from the first location to a first point on the structure;
  acquiring an azimuth reading and a tilt reading at a second location, using a distance measuring device to measure the distance from the second location to a second point on the structure;
  acquiring a first digital image of said structure and/or second digital image of said structure from said first and/or second locations, respectively; establishing a scale using two positions of the structure in the first and/or second digital image and the distance measured from the first and/or second location, respectively, to the structure;
  finding the distance between said first point on the structure and second point on the structure by using said established scale; and using the distance between said points, in conjunction with the distances measured between the first and/or second point and the first and/or second location, respectively, and the azimuth and tilt readings acquired at each respective location, to establish a baseline between the first and said locations to derive an epipolar model of the said structure.

In some configurations, the digital image, azimuth reading, and tilt reading at either the first or second location can be acquired substantially simultaneously.

In some configurations, the structure can be a utility pole.

In some configurations, each digital image and associated readings can be acquired using a single apparatus.

In some configurations, the absolute difference between the azimuth readings acquired from the first and second locations can be 50° to 130°.

In some configurations, establishing the scale can include determining the vertical height of the structure by using the angular separation between the top and bottom of the structure in the first and/or second digital image in conjunction with the distance measured from the first and/or second location to the first and/or second point on the structure, respectively.

In some configurations, the angular separation between the top and bottom of the structure can be determined by the number of pixels between said top and bottom in said first and/or second digital image.

In some configurations, the method can further include photogrammetrically measuring said structure using said epipolar model to produce measurements, wherein said structure is a utility pole and/or hardware associated with a utility pole; comparing said measurements of said utility pole and/or associated hardware with a predetermined set of rules and/or regulations; and determining the compliance status of said utility pole and/or associated hardware based on said comparison between said measurements and said rules and/or regulations.

In some configurations, the method can further include photogrammetrically measuring said structure using said epipolar model to produce measurements, wherein said structure is a utility pole and/or hardware associated with a utility pole; constructing a virtual model of said utility pole and/or associated hardware using said measurements; simulating at least some of the conditions or scenarios used to determine the compliance status of a utility pole and/or associated hardware; simulating the behaviour of said virtual model in said simulated conditions or scenarios; and determining the compliance status of said utility pole and/or associated hardware based on said simulated behaviour of said virtual model in said simulated conditions.

In some configurations, the method can further include measuring a position of a surface of said structure in a geographic coordinate system; and applying one or more offsets to said measured position.

In some configurations, a method of estimating the likelihood that a utility pole belongs to each class of a plurality of classes can comprise:
  generating a table which includes a plurality of classes said utility pole could be classified as;
  assigning each class a score or weight indicating the likelihood that said utility pole belongs to that respective class, wherein the score or weight is at least partially determined by a measurement or characteristic of said utility pole derived using photogrammetry; and
  indicating the likelihood that the utility pole is classified as one or more classes based on the scores or weights assigned to each class.

In some configurations, the measurement or characteristic of the utility pole can be the embedment height, circumference, and/or taper of the utility pole.

In some configurations, the measurement or characteristic of the utility pole can be the presence of additional pole hardware or a measurement or characteristic derived from said additional pole hardware.

In some configurations, assigning each class a score or weight can include: for each class, comparing a measurement or characteristic derived from the utility pole using photogrammetry with a corresponding ideal measurement or characteristic representative of a utility pole belonging to that class; and assigning a score or weight for that class based on said comparison.

In some configurations a computer-implemented method for assisting the photogrammetric measurement of an object in a digital image can comprise:

displaying said digital image on a digital display;

displaying a cursor on said digital image on said digital display, wherein:

a shape of said cursor is at least partially determined by a shape of the object to be measured, a size of said cursor is at least partially determined by a scale photogrammetrically established from said digital image, and a skew of said cursor is at least partially determined by the perspective of said object when viewed from said digital image;

superimposing said cursor over said object on said digital display; and if necessary, adjusting a shape, a size, or a skew of said cursor to match a shape, a size, or a skew of said object to be measured.

In some configurations, the object can be a utility pole, a transformer, a guy wire, a lamp, or a cross-arm.

In some configurations, the method can aid in the photogrammetric measurement of at least one of: the location of the base of a utility pole; the height of a utility pole above ground; the diameter at the base of a utility pole; the diameter at the top of a utility pole; the lean of a utility pole; the attachment height of a transformer; the diameter of a transformer; the size of a transformer; the direction of a transformer; the attachment height of a guy wire; the direction of a guy wire; the attachment height of a cross-arm; the length of a cross-arm; the thickness of a cross-arm; or; the direction of a cross-arm.

In some configurations, the cursor can convey the depth of at least a portion of the digital image which the cursor is superimposed over.

In some configurations, the depth of the portion of the image can be conveyed through: a colour of the cursor; an opacity of the cursor; a size of the cursor; a shape of the cursor, and/or; a skew of the cursor.

In some configurations, a size, shape, or skew of the cursor can represent a constant height, width, or depth of the object to be measured, after accounting for the perspective of the digital image.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIGS. 3a-3d show a pair of digital images of a utility pole and the locations from which the digital images were taken;

DETAILED DESCRIPTION

Measuring the dimensions of real-world objects from images or photographs is known as photogrammetry. One technique commonly used in the field of photogrammetry is an epipolar geometry. Two or more stereoscopic images of an object are acquired from different perspectives, and the disparity between the images is converted into a depth. This principal is used to perceive depth by humans and other animals.

If two or more images are taken of an object from varying perspectives, an epipolar geometry can be established describing the geometry between the object and the positions where the images were acquired. The epipolar geometry can be used to describe the height, width, and depth between any two points in one of the given images. If a scale is established to relate the height, width, and depth measured in the image to a real-world measurement, the dimensions of the object can be accurately measured from either or both of the images.

Existing techniques to establish an epipolar geometry rely on precisely measuring the distance between a single point on a structure or object and two or more respective locations. If the points measured from each location are even slightly different, inaccuracies are introduced into the epipolar model. These inaccuracies are compounded when photogrammetric measurements are made, which may consequently be unacceptably imprecise. Accurately measuring the distance between a single point on the structure and two or more locations requires expensive surveying and distance-measuring equipment and highly trained personnel. Extraneous equipment such as reflectors or other reference markers may also need to be installed on the structure, increasing the time and effort required to take accurate photogrammetric measurements.

In contrast, the techniques disclosed within this specification do not require distance measurements from a single point on the structure. The distance from each respective location to entirely separate points on the structure or utility pole may be used to construct an accurate epipolar baseline between the two locations. Comparatively basic and inexpensive equipment may be used by an operator without requiring great skill or expertise.

Figure 1:
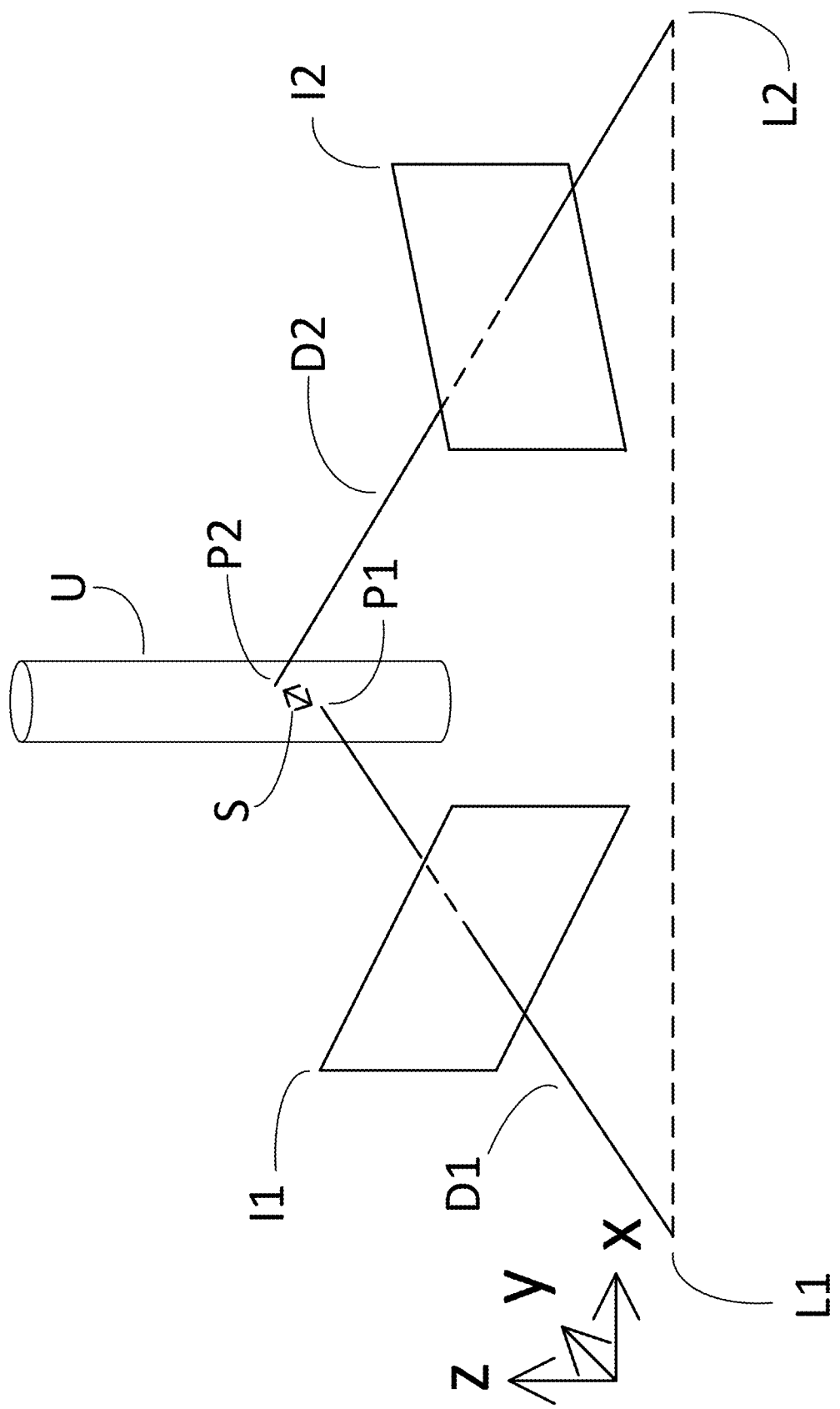
FIG. 1 is a diagram depicting the derivation of a vector between two laser points on a pole.

FIG. 1 illustrates the acquisition of two images and distances to establish an epipolar geometry. An operator takes an image of a structure U from location L1 using an image acquisition apparatus, such as a camera. The image of the structure U appears on imaging plane 11 of the image acquisition apparatus. A distance D1 from the location L1 to a point P1 on the structure U is also measured. The operator then repeats the process from a separate location L2, imaging the structure U on the image plane 12. A distance is also measured from location L2 to a point P2 on the structure U. In the embodiments disclosed in this specification, the points P1 and P2 on the structure U need not be identical, and there may be a separation vector S between the two points in real space. Constructing an epipolar geometry to describe the relation between L1, L2, 11, 12, and U may require accurately knowing the geometric relationship between L1, L2, and U, the geometric optics of the image acquisition apparatus, and the separation vector S between points P1 and P2.

In some embodiments, the structure to be photogrammetrically measured may be a building. In a preferred embodiment, the structure may be an item of infrastructure. In yet another preferred embodiment, the structure may be a utility pole, power pole, telephone pole, or other similar structure.

Figure 2:
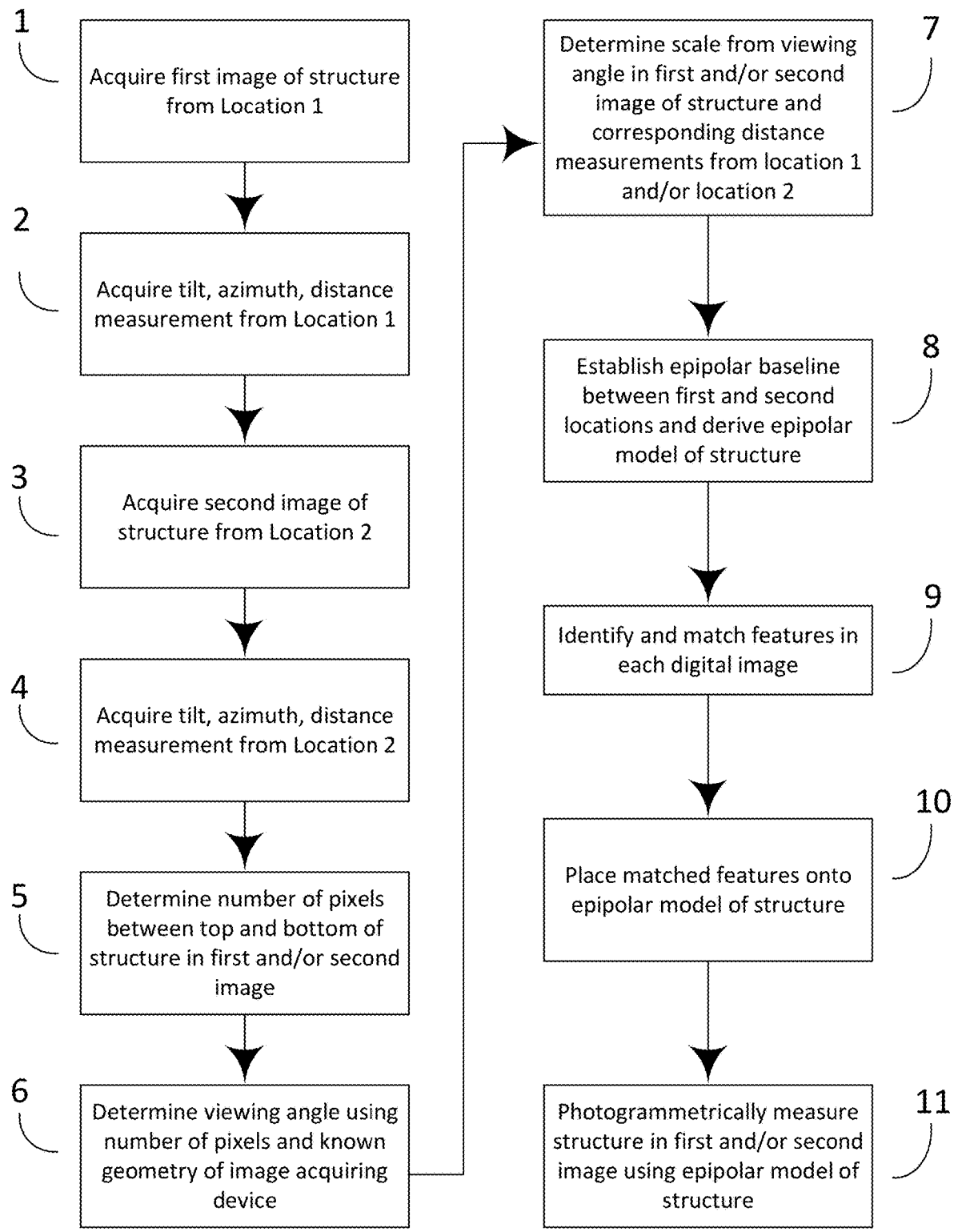
FIG. 2 is a flowchart depicting a method for photogrammetrically measuring a structure.

FIG. 2 illustrates a computer-implemented method of photogrammetrically measuring a structure according to an example embodiment. An operator uses an image acquisition apparatus to acquire a first digital image of the structure to be measured from a first location, as indicated in step 1. Tilt and azimuth measurements are also acquired at the first location, and the distance from the first location to the structure is also acquired, as indicated in step 2.

The operator then moves to a second location, different from the first, and acquires a second digital image of the structure, shown in step 3. Tilt and azimuth measurements at the second location are also acquired in step 4, in addition to an optional distance measurement from the second location to the structure. The absolute difference between the two azimuth measurements is preferably between 50° to 130°. The applicant has found that this difference in perspective between each image yields the most accurate and reliable photogrammetric measurements.

Having acquired digital images of the structure and tilt and azimuth measurements from the first and second locations, in addition to distance measurements from each of the locations to the structure, a scale may be established in at least one of the digital images. In one embodiment, the scale is at least partially determined by determining the number of pixels between two points of the structure in one of the digital images, as in step 5. Knowing the distance from the structure and the relationship as to the number of pixels per unit of length at that distance a dimension of the structure may be determined. In a further embodiment, the number of pixels between the top and bottom of the structure in the digital image is converted into a viewing angle by using known properties about the camera or apparatus used to acquire the digital image, e.g. geometric properties of its known optical axis, as in step 6. An approximate scale can then be established through trigonometry by using the viewing angle between the top and bottom of the structure in conjunction with the distance measured between the structure and the location from where the digital image was taken, as depicted in step 7.

An epipolar baseline is then established between the first and second locations and an epipolar model of the structure is derived, as in step 5. Although the following embodiments and examples of this step will be presented in terms of a utility pole, it will be appreciated by the person skilled in the art that this is not intended to be limiting, and a similar approach may be taken with other structures without loss of generality.

To establish the baseline between the first and second locations, the digital images acquired at each respective location are displayed on a computer screen or display. The operator marks the top and bottom of the utility pole in each image using a cursor or other means. In some embodiments, the operator may use a parametric cursor which is especially adapted for measuring utility poles. These parametric cursors are described later in this specification.

Each point on the structure used in the distance measurement from the first or second location is then identified in its respective digital image. This is possible as the optical axis of the camera or image acquisition apparatus is known and is correlated to the measurement axis of the distance measuring apparatus. As a non-limiting example, the centre pixel in each digital image may correspond to the point used to take distance measurements. Identifying the point on the structure used in a distance measurement then corresponds to identifying the centre pixel in its respective digital image. In other embodiments, the pixel corresponding to the distance measuring point may be a known off-centre pixel, and the point on the structure used in the distance measurement may be identified accordingly.

To relate the separate distance-measuring points on the utility pole to one another, the utility pole is first modeled as a single vertical line in real space, corresponding to an infinitely thin and tall pole. The centre or other known pixel in each image is placed on this modeled line by considering its position in relation to the marked top and bottom of the utility pole in each respective digital image. Because each digital image is acquired from a different perspective, the number of pixels between the top and bottom of the utility pole in each respective digital image may differ. The position of the centre or known pixel may therefore be expressed in proportion to the marked top and bottom of the utility pole in each respective image. The proportional position of the centre or known pixel can then be scaled appropriately to position it on the modeled cylinder. In some embodiments, placing each centre or known pixel onto the utility pole, or equivalently each point used to measure distance onto the utility pole, may establish a scale to be used with the modelled pole.

In a next iteration, the utility pole is modeled as a cylinder with a finite width. The centre or known pixel in each digital image is then placed on the modeled cylinder by once again considering its position relative to the marked top and bottom of the utility pole in its respective digital image. Because the modeled cylinder has a finite width, the horizontal component of the centre or known pixel is taken into consideration when placing it on the modeled cylinder. The diameter of the modelled cylinder may be determined by measuring the diameter of the utility pole as measured in either or both of the digital images using an established scale.

This scale may be at least partially determined by the scale established in the previous iteration of the modelled pole. In some embodiments, this iteration may adjust or correct a scale previously established in either one or both of the digital images, or a scale previously established to be used with the modelled pole.

The process is then iterated again with the utility pole modeled as a tapered cylinder. The difference in diameter between the top and bottom of the utility pole in each digital image is taken into consideration, and the modeled cylinder is given a corresponding taper along its length. The centre or known pixel in each digital image is placed on this tapered cylinder as before, using the same scaling process to determine its position in proportion to the top and bottom of the utility pole in each respective image, and in proportion to the tapered diameter of the utility pole. In some embodiments, this further iteration may be used to further adjust or correct a scale established in either one or both of the digital images, or a scale previously established to be used with the modelled pole.

Having accurately identified and placed the separate points used in each distance measurement onto the modelled tapered cylinder, and established a scale by considering the top and bottom of the utility pole in each respective digital image, the difference in the positions of the separate points and a separation vector between them can be determined. The first and second location used to acquire each digital image and associated readings can then be spatially determined in relation to the modeled tapered cylinder by geometrically back-tracing a ray from each of the distance-measuring points on the tapered cylinder to its respective location. Because the distance, azimuth, and tilt of the geometric ray is known, and its terminating point on the modelled tapered cylinder is known, the point of origin of the ray (i.e. the first or second location) can be accurately determined. This determines the local coordinates of the first and second location in relation to the structure or utility pole.

A baseline vector describing the translation between the first and second locations can then be determined, and the azimuth and tilt measurements taken from each respective location can be used to describe the rotation between each imaging plane. The translation and rotation between each imaging plane, in addition to the known intrinsic geometries of the image acquisition apparatus such as the focal length, principle point, pixel size, and skew, can then be used to derive an epipolar model of the utility pole. In embodiments where the intrinsic geometries of the image acquisition may be initially unknown, the intrinsic camera parameters may be determined by considering the relationship between the matched features in each digital image. This may be achieved by using an 8-point algorithm or any other technique recognised by those skilled in the art to solve the essential matrix, fundamental matrix, or either or both of the matrices of the intrinsic camera parameters.

Once an epipolar model of the utility pole or structure has been established, the elements or components of the utility pole or structure which are off-axis from the modelled pole—such as cross-arms, transformers, and guy wires—are consequently modelled. In some embodiments, this is achieved by matching features of the off-axis elements or parts between both images, as in step 9. Each point or feature identified in a given digital image is restricted to an epipolar line in the other corresponding digital image. Restricting the same feature in that digital image to another point on the epipolar line establishes an epipolar model of that part or element, which is consequently placed on the epipolar model of the structure or utility pole, as in step 10.

In some embodiments, features are manually matched in each image by the operator or another person. This may increase the overall accuracy of the image matching process, as each matched feature has been identified and vetted by a person. In alternative embodiments, some or all of the features may be identified and matched by a computer. This could be achieved using standard image analysis techniques known to those skilled in the arts, such as threshold matching, edge detection, or other machine vision algorithms employed in the field. Those skilled in the art will recognise that a range of algorithms and known image processing techinques could be used for this purpose.

Once an epipolar model of the structure or utility pole and its associated elements or components has been established, depth in each digital image is determined by the epipolar geometry between each of the locations and the modelled structure or utility pole. In some embodiments, the disparity between matched features is used to compute (x,y,z) coordinates for each pixel in each image. In other embodiments, depth is computed only for the elements or parts which have been identified and matched between each of the digital images. Photogrammetric measurements of the structure or utility pole and its associated elements or parts can then be made in either or both of the digital images, as shown in step 11.

In some embodiments, the digital images in steps 1 and 3 may be taken using light, e.g. a digital photograph. The digital image can be acquired using any image acquisition apparatus known to a person skilled in the art, such as a digital camera utilising a CCD or other image detector in the case of a photograph. It is envisaged that in most embodiments the digital image will be acquired using light in the visible spectrum, but in alternative embodiments the image acquisition apparatus may acquire digital images in infra-red or any other wavelength of light.

Alternatively, the digital image may be a cloud-of-points, e.g. an image acquired using LIDAR, or a combination of a digital photograph and a cloud-of-points Although the above embodiments have been mainly described in the context of digital images acquired using light (e.g. photographs), it is to be understood by the addressee that the same techniques discussed herein could equally apply to clouds-of-points. As a non-limiting example, a sparse cloud-of-points may be overlaid with a digital photograph, and the sparse point data may be used to establish an epipolar model of the structure in the place of feature matching. In other embodiments, a sparse cloud-of-points may be considered individually, and the above methods used to infer and extrapolate the dimensions of the areas of the digital image where there is insufficient point data. In yet another embodiment, the methods used herein may be applied to dense clouds-of-points, and the epipolar geometry established using this method may be used to infer dimensions in the digital image from a different perspective not represented in the digital image. The person skilled in the art will understand various ways in which the methods described herein may be applied to clouds of points or other digital images.

The tilt measurements acquired in steps 2 and 4 may be acquired using any standard or suitable apparatus known to those skilled in the art. As a non-limiting example, the tilt measurements can be acquired using a two-axis microelectromechanical system inclinometer or tilt sensor. Alternatively, the tilt measurements can be acquired using a liquid capacitive or electrolytic inclinometer. Similarly, azimuth measurements acquired in steps 2 and 4 may be acquired using any standard apparatus known to those skilled in the art. In some embodiments, the azimuth measurements are acquired using a compass, such as a three-axis electronic magnetometer or other solid-state microelectromechanical system. In other embodiments, the azimuth measurements may be acquired by determining the azimuth at the first or second location using a positioning system, such as DGPS.

In some embodiments, the distance measurements acquired in steps 2 and 4 are acquired using a time-of-flight measurement, such as a laser rangefinder or sonic rangefinder. Other embodiments may use measurement apparatus which do not rely on time-of-flight, such as split-image rangefinders.

Preferably, there is a known relationship between the optical axis of the image acquisition apparatus and the distance measuring apparatus. For example, the distance measuring apparatus may be calibrated so that the center pixel of the digital image corresponds to a time-of-flight measurement.

In a preferred embodiment, a single apparatus is used to acquire the digital images, tilt and azimuth measurements, and distance measurements. This preferred embodiment may allow the operator to ergonomically acquire all respective images and measurements without necessarily carrying several devices or apparatus.

In a further preferred embodiment, the single apparatus acquires each digital image, tilt measurement, azimuth measurement, and distance measurement substantially simultaneously. This may streamline the measurement acquisition process for the operator. As a non-limiting example, the operator may sight the object through a viewfinder to acquire a digital image. When the operator acquires the digital image by pushing a button on the single apparatus, the tilt, azimuth, and distance measurements may also be automatically acquired at the same time. Preferably, the distance acquired will correspond to the center pixel of the digital image. Alternatively, the distance acquired may correspond to a known off-center pixel of the digital image. Those skilled in the art will recognise the various ways that an operator could acquire digital images and their corresponding measurements substantially simultaneously.

In alternative embodiments, the digital images, tilt, azimuth, and distance measurements may be acquired using two or more separate apparatus. This may be advantageous when the digital images, tilt, azimuth, and/or distance measurements are acquired at separate times. This may be desirable when supplementing existing data with additional measurements required to perform the method depicted in FIG. 2. As a non-limiting example, a complete database of digital images of a collection of structures may already exist, and the operator may only need to acquire tilt, azimuth, and distance measurements from each image's respective location.

The digital images and associated tilt, azimuth, and/or distance measurements may be acquired by or from a vehicle. This may increase the overall efficiency of data acquisition if multiple structures are connected by a road or other thoroughfare. In some embodiments, the vehicle may be a land-based vehicle such as a car, and the operator may operate one or more apparatus from inside the car. In an alternative embodiment, the car may autonomously acquire digital images of structures and the associated tilt, azimuth, and distance measurements at each location, which would further increase the overall efficiency of data collection.

In further alternative embodiments, the vehicle may be air-based, such as an unmanned aerial vehicle (UAV) or drone equipped with one or more apparatus to acquire the necessary digital images and readings. In this non-limiting example, the UAV or drone may be autonomous or have a pre-planned path with minimal involvement from the operator. In an alternative embodiment, the operator may operate the UAV or drone remotely, operating or controlling the UAV or drone from some distance away.

In alternative embodiments and without loss of generality, the techniques used to relate each location to the utility pole or structure may differ from the iterative process described herein as an example embodiment. For example, GPS or DGPS readings may be taken at the first and second location, and the position on the structure or utility pole used to measure the distance from each respective location may be iteratively trilaterated between each location as recorded by the GPS or DGPS.

In other embodiments, a similar iterative model may be employed, but a different geometry may be chosen to accurately model the structure to be measured. For example, if the structure is a cuboidal building, the iterative model may represent a cuboid as opposed to a cylinder. In another embodiment, measurements may be made of a structure consisting of a single plane, such as a wall or billboard, and the modelled structure may be iteratively represented as a plane in space as opposed to a 3D cylinder. It will be apparent that the most useful model used to iteratively determine a baseline between the two locations will depend on the geometry between the two points on the structure used to measure distance from the first and second location, and consequently the geometry of the structure itself. The model used to iteratively measure the separation vector between the two points may be adjusted or adapted to meet the needs of the geometry of the structure without loss of generality, or without departing from the spirit or scope of the invention disclosed herein. FIGS. 3a to 3d show an embodiment of the method used in the photogrammetric measurement of a utility pole. Two digital images 12 and 13 shown in FIGS. 3a and 3b depict utility pole 14 from two different perspectives. The first and second locations 15 and 16 where the operator took each respective digital image are displayed from a bird's-eye perspective in FIGS. 3c and 3d in relation to utility pole 14, in addition to the azimuth $\alpha$, tilt $\theta$, and distance measurement d recorded at each location. The absolute difference between the two azimuth measurements is preferably between 50° to 130°.

Figure 4A:
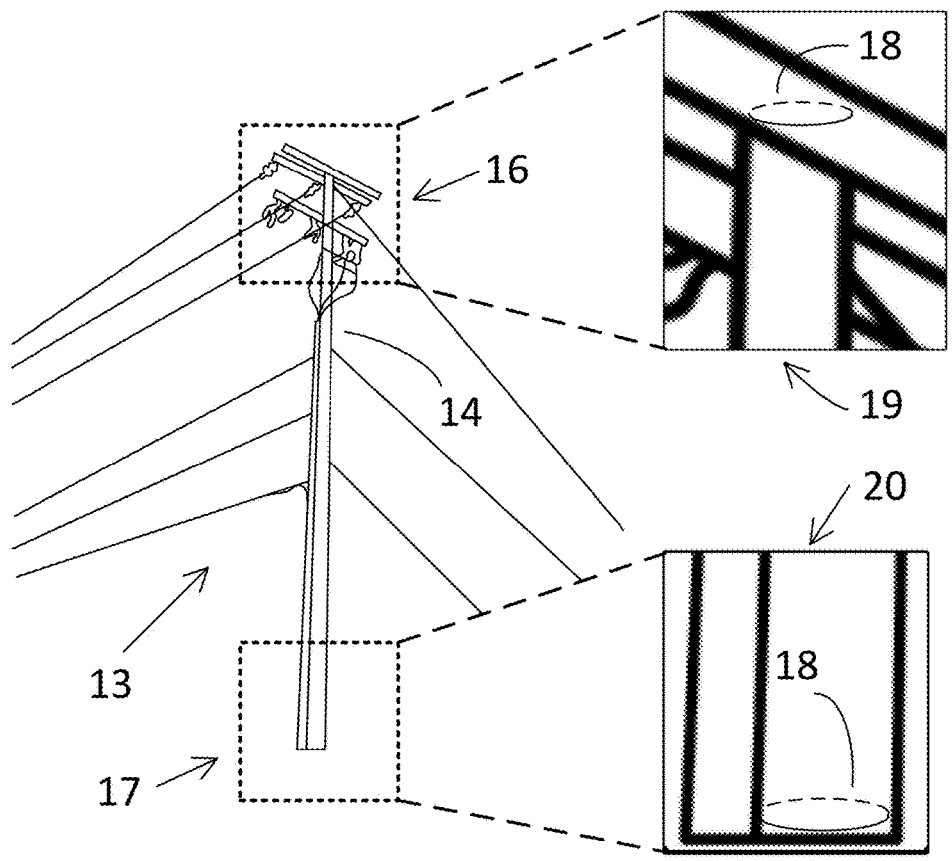
FIG. 4a shows a digital image of a utility pole depicting the top and bottom of the utility pole.

FIG. 4a depicts the establishment of a scale in one of the digital images. In this non-limiting example, the second digital image 13 is used to establish the scale. The choice of the second digital image is purely illustrative and is included as a non-limiting embodiment. In some embodiments, the first digital image may be used to establish a scale. In other embodiments, both the first and the second digital images may be used to establish a scale.

To establish a scale, the top 16 and bottom 17 of the utility pole 14 are both indicated. In this non-limiting example, the digital images are first displayed on a computer screen, computer display, or any other display capable or suitable to display a digital image. Further in this non-limiting example, the operator indicates the top and bottom of the utility pole using a specialised cursor 18 adapted to indicate a constant cross-section of the utility pole. These specialised cursors account for the perspective of digital images to allow for accurate parametric measurements, and are discussed in more detail later in this specification. A magnified or zoomed-in portion or inset 19 and 20 of the digital image 13 may also be displayed to aid in the accurate positioning of the cursor.

In alternative embodiments, the top and bottom of the utility pole or structure may be indicated by the operator using other cursors used in the art, or by other indication means. In some embodiments, an algorithm may identify or suggest the likely top and bottom of the utility pole or structure, and the operator may confirm or correct the suggested positions using a cursor or other means. In yet a further embodiment, the determination of the top and bottom of the utility pole or structure may be entirely determined algorithmically using machine learning or machine vision techniques known in the art, such as segmentation, edge detection, and/or pattern recognition. In these embodiments, the digital images do not need to be displayed on a computer screen or display to identify their top and bottom and to establish a scale.

In a preferred embodiment, having indicated the top and bottom of the utility pole in one or both of the digital images, the number of pixels between the marked top and bottom of the utility pole in said digital image is determined. This determination may be achieved by using any method or means known to those skilled in the art, such as Bresenham's line algorithm. Those skilled in the art will recognise the various ways in which scale may be determined based on the number of pixels between two points and the distance to an object.

Figure 4B:
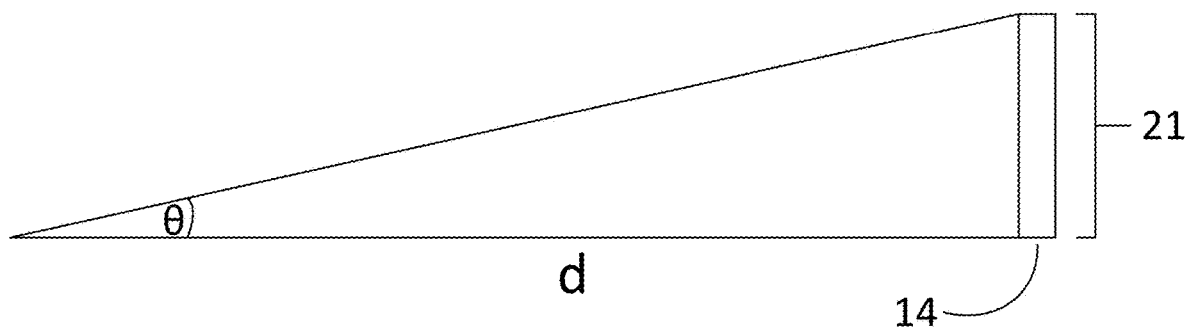
FIG. 4b is a trigonometric schematic diagram of estimating the height of a utility pole.

In one embodiment, the determined number of pixels between the top and bottom of the structure or utility pole may be converted into a viewing angle $\theta$ using the known geometry of the digital camera or image acquisition apparatus, as shown in FIG. 4*b*. This requires knowledge of the digital camera or image acquisition apparatus such as its focal length and optical axis. The height 21 of the utility pole or structure 14 can then be approximated by using the converted viewing angle $\theta$ and the distance d measured from the location associated with the digital image to the structure or utility pole. In some embodiments, the measured distance may be corrected by accounting for the tilt included in the distance measurement. Accounting for tilt included in distance measurements yields the purely 'horizontal' distance from the location to the structure or utility pole—namely, the distance parallel to the flat ground plane, with no vertical component normal or perpendicular to the ground plane.

Figure 5A:
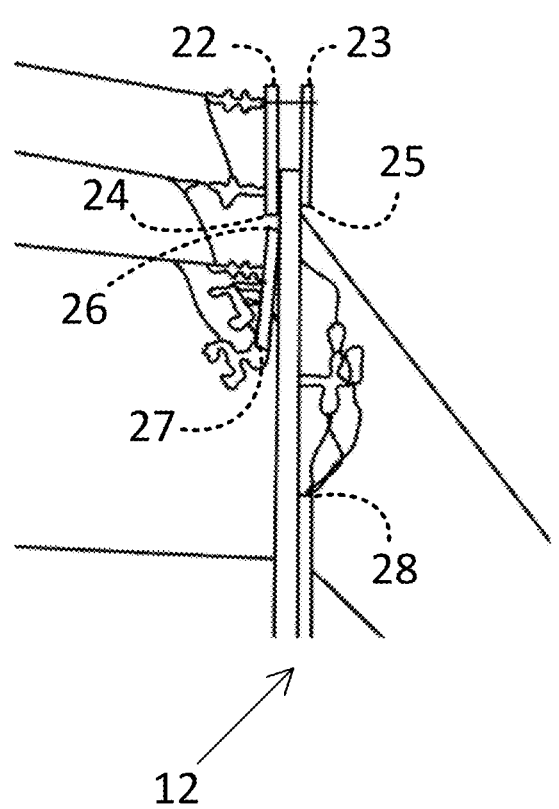
FIGS. 5a & 5b show a pair of digital images of a utility pole indicating which features have been matched.
Figure 5B:
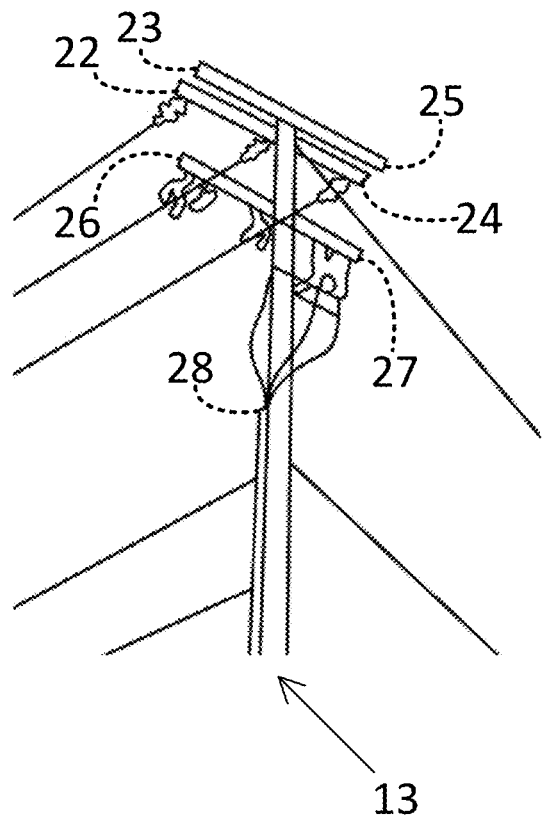

FIGS. 5*a* and 5*b* depict the identification and matching of features between the two digital images. In a preferred embodiment, both digital images 12 and 13 are displayed on a computer screen or other display, and features of the utility pole 22-28 are identified and matched in each image by the operator. The features which are identified and matched are ideally clearly discernible by the operator, and all of the features must be visible in both digital images. In the non-limiting example depicted in FIG. 4, terminating ends 22-25 of cross-arms are selected. Additional features which are easily identifiable, such as the conduit 28, can also be selected. Other hardware on utility poles such as transformers, lamps, insulators, and guy wires are useful as identifiable features. The features selected in FIG. 5 are non-limiting, and a variety of suitable features can be chosen. Furthermore, features can be chosen from both the top and bottom of the utility pole 14.

The operator may select and match features in each digital image using a standard cursor on a computer screen or display. In other embodiments, the operator may use a specialised set of parametric cursors to aid in the accurate matching of features. The applicant has found that using a person to identify and match features can yield highly accurate results when dealing with pairs of images which are approximately orthogonal. In comparison, known computer-aided methods can occasionally have difficulty accurately identifying and matching features between approximately orthogonal images.

Conversely, in some embodiments, the features may be identified and matched with the aid of image analysis or other machine vision techniques. In some embodiments, an algorithm or other system may suggest identified and matched features between the two digital images, and prompt the operator to confirm or correct the suggested features. In other embodiments, the feature identification and matching may be performed completely using image analysis or machine vision without any input from the operator. A large number of known algorithms or other techniques can be used to identify and match features to establish an epipolar baseline between two cameras, such as normalised cross-correlation methods. Those skilled in the art will recognise the variety of methods and techniques that can be used to identify and match features in epipolar applications. In embodiments where image analysis or machine vision is used to match and identify features, the digital images may be rectified using the azimuth/tilt measurements or otherwise to produce parallel images. This constrains epipolar lines on each image to be parallel and horizontal, which can improve the accuracy of correlating points between the two images.

Figure 6:
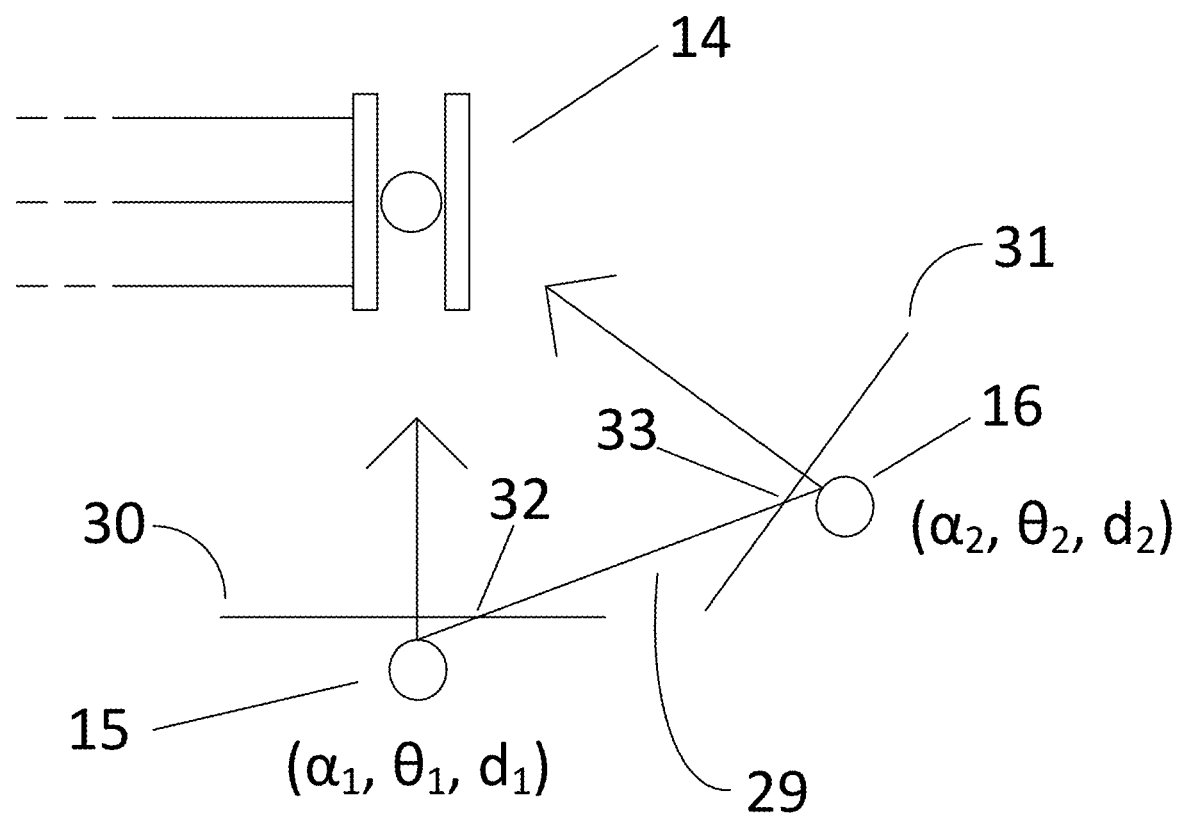
FIG. 6 is a diagram showing an epipolar baseline established between two locations.

FIG. 6 shows a bird's eye view of the epipolar baseline 29 between the two locations 15 and 16 after the utility pole has been modelled and the features of its off-axis elements or components have been matched in each respective digital image. The two image planes 30 and 31 are shown respectively, and the epipolar baseline 29 intersects these image planes at each epipole 32 and 33. The utility pole and its off-axis elements or components have been modelled in the epipolar geometry relating the two locations and images of the utility pole, ascribing (x,y,z) coordinates to each pixel in each of the digital images and allowing for accurate photogrammetric measurements to be made.

Utility operators also typically want to know the geographic coordinates of each of their utility poles in addition to their dimensions or characteristics in order to maintain accurate records of their utility pole stock. This information is not only useful for inventory purposes, but may also allow the utility operator to measure or infer the length and direction of any wires which span a given collection of utility poles.

An operator may wish to know the direction of a given wire span to an accuracy of less than 1 degree. However, measurements of this accuracy are only possible if the corresponding locations of the utility poles are measured to the same level of accuracy. This presents a problem as accurately measuring the location of a utility pole within a geographic coordinate system typically poses several difficulties.

Utility poles are generally cylindrical or otherwise have some form of symmetry about a central point in cross-section, and the centre of the utility pole at the ground line (i.e. the bottom of the pole) is usually treated as the actual location of the utility pole. The centre of the top face of the utility pole may also be used as the actual location of the utility pole, but this is generally less preferable as the top face of the utility pole will usually move around more than the bottom of the utility pole over the pole's lifetime.

A surveying device with GNSS capability (or other device with similar functionality) would ideally be placed at the centre of the pole at the ground line to directly measure the geographic coordinates of the utility pole with high precision.

However, utility poles are solid objects and a GNSS antenna cannot be placed at the actual centre of the pole. Instead, the operator may measure and record a point on the surface of the utility pole as the pole's location.

To measure the location of a utility pole in a potentially more accurate way, an operator may first measure a position of a point of the exterior surface of the pole or structure in a geographic coordinate system. A surveying device with GNSS functionality may be used for this purpose. One or more offsets may then be applied to this measured position to better estimate the location of the actual centre of the pole. These offsets may be applied by the surveying device. The operator may make these measurements at the same time as they acquire photographs and other readings for photogrammetric measurements, as described earlier in this specification.

In some embodiments, the operator will physically abut the surveying device against the pole's surface. The surveying device will ideally be 'normal' to the pole—in other words, the surveying device will be held horizontally against the vertical pole to make a 90 degree angle between the two. In situations where the pole is not vertical, the operator may hold the surveying device against the pole so that it is level with the horizon. In other embodiments, the surveying device may abut the pole at a non-normal angle.

When the operator has placed the surveying device in the appropriate position against the pole, the GNSS functionality of the surveying device is used to measure and record the location of the surveying device. In some embodiments, the surveying device may also simultaneously record its bearing and/or orientation (for example, its pitch, yaw, and roll.) This is particularly useful in embodiments where the surveying device abuts the pole at a non-normal angle.

The surveying device may then refine the measured location by applying one or more offsets to the measured position. Each of the offsets applied to the measured position may be a vector (i.e. may have a direction and a magnitude or distance.) In some embodiments, the magnitude and/or direction of the one or more offset vectors may be predetermined. In other embodiments, these may be determined on-site.

As an illustrative example, the location as measured by the surveying device typically corresponds to the location of the GNSS antenna housed within the device itself, rather than the abutting surface of the surveying device. To more accurately measure the location of the pole which the device is in contact with, the surveying device may apply a first offset or vector to account for the distance between the GNSS antenna and the external surface of the surveying device. The distance of the first offset (or magnitude of the vector) will usually be predetermined and will depend on the construction of the surveying device used by the operator. If the surveying device is held at an angle against the pole, its orientation in space may be recorded and used to further inform the direction and magnitude of the first offset or vector.

In some embodiments, the direction of the first offset or vector will correspond to the bearing of the surveying device recorded at substantially the same time as the GNSS measurement. In other embodiments, the direction of the first offset or vector may be predetermined—for example, it may be fixed north or south. In these embodiments, the operator will need to measure the surface of the utility pole from the predetermined direction in order for the surveying device to accurately apply the first offset. The surveying device may display a compass or other indicator to assist the operator in aligning the surveying device along the predetermined direction.

Once the distance or magnitude and direction of the first offset has been determined, it is applied to the location originally measured by the surveying device to produce a first set of adjusted coordinates. The first set of adjusted coordinates more accurately represents the location of the exterior surface of the pole which the surveying device abuts. The surveying device may then apply a second offset or vector to the first set of adjusted coordinates to account for the distance between the outside surface of the pole and its true centre. If the pole is cylindrical, this distance will typically be equal to the pole's radius.

In most embodiments, the second offset or vector will have the same direction as the first offset or vector. This direction may be the measured bearing of the surveying device, or may be predetermined. In some embodiments, the distance or magnitude of the second offset or vector will be predetermined. In other embodiments, the distance or magnitude may be determined on-site.

For example, the surveying device may locally store a lookup table or remotely access a lookup table which includes the different radii of different classes of utility poles. The operator may determine the class of the utility pole on-site and may input the class to the surveying device. The surveying device may then set the magnitude of the second offset or vector to the pole's radius which is inferred via the lookup table. The surveying device may then apply the offset to the first set of adjusted coordinates to produce a second set of adjusted coordinates. The second set of adjusted coordinates may correspond to a more accurate estimation of the true centre of the utility pole.

In other embodiments, the class or radius of the utility pole may be inferred or measured through photogrammetry (as in this specification) and may be used to determine the magnitude or distance of the second offset. In still further embodiments, the operator may directly measure the diameter or radius of the utility pole and input this measurement to the surveying device to determine the magnitude or distance of the second offset. In yet a further embodiment, the magnitude or distance of the second offset may be a fixed and predetermined number. This may be advantageous if the operator knows the radii of the poles to be measured in advance.

In further embodiments, the surveying device may infer or determine the radius of the pole by measuring the location of more than one point on the pole's surface. For example, the operator may measure the location of a first point on the pole, and then may measure another point on the opposite side of the pole. In these embodiments, the surveying device may display a compass or other indicator to assist the operator in accurately measuring the opposite side of the pole. The surveying device may then average the one or more measured locations to produce a mid-way point to represent the true centre of the pole.

In these embodiments, the surveying device may still apply a first offset to correct for the distance between the GNSS antenna and the exterior housing of the surveying device during each respective measurement, before the mid-way point bas been determined. In other embodiments, the surveying device may not need to apply an offset, and may directly infer the centre of the pole by comparing multiple as-measured locations of the pole's surface. Whether offsets are used may depend on the level of accuracy required by the operator.

When the operator makes photogrammetric measurements of structures or utilities poles in digital images, they may use a specialised set of parametric tools and cursors. These parametric cursors are designed to enable three-dimensional measurements of objects in two-dimensional images or on two-dimensional displays. As a non-limiting example, these objects can be utility poles themselves, or can be utility pole hardware, such as transformers, cross-arms, guy wires, or lamps. Furthermore, 'images' when used in this sense can refer to digital photographs captured using light, but can also refer to cloud-of-points or other images which intrinsically have three-dimensional coordinate data contained within them.

Figure 7:
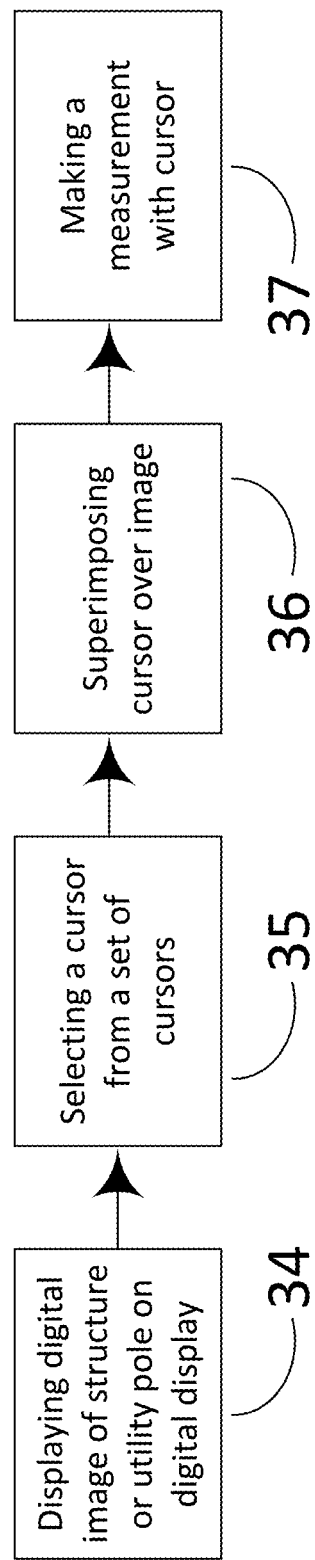
FIG. 7 is a flowchart depicting a method of using a parametric cursor to measure an object in a digital image.

FIG. 7 depicts a computer-implemented method of using a specialised set of cursors to assist the measurement of an object in a digital image. A digital image of the structure or utility pole is first displayed on a digital display as in step 34, such as a computer screen or computer display, or any other display configured to display a digital image. Those skilled in the art will recognise the wide variety of means to display digital images. The digital image also contains information on the dimensions of the depicted object. In some embodiments, these digital images will include epipolar models of the objects to be measured, and each pixel will have an (x,y,z) coordinate. In other embodiments, the digital images may be LIDAR scans of the object to be measured, and dimensional data will be intrinsically included in the image.

Once the digital image is displayed on an appropriate display, a cursor is selected from the set of parametric tools or cursors, as in step 35. The shape of the cursor is at least partially determined by the shape of the object to be imaged. In general and without limitation, the shape of the cursor may correspond to a three-dimensional shape of the object, a two-dimensional cross-section of the object, or a one-dimensional line with some useful correspondence to the object. As a non-limiting example, if the object is a transformer on a utility pole, the shape of the cursor may be cylindrical to measure the height and diameter of the transformer, as the transformer itself is cylindrical. Alternatively, the shape of the cursor may be a two-dimensional circle representing a constant height, which may represent a constant height cross-section of the cylindrical transformer. Alternatively, the shape of the cursor may be a one-dimensional line parallel with the central axis of the transformer. As a further non-limiting example, the object may be a cross-arm, and the shape of that cross-arm may be a cuboid. The shape of the cursor may correspond to a cuboid, representing the shape of the object, or the shape of the cursor may be a two-dimensional rectangle, corresponding to a cross-section of the cuboidal cross-arm.

The size of the cursor is at least partially determined by a scale established from the digital image. In the case of an epipolar image, the size of the cursor may be established from the epipolar scale. For example, the size of the cursor may be directly scaled to the size of the object, so that the cursor and the object are the same size. In alternative embodiments, the size of the cursor may be scaled to directly correspond to the size of a cross-section of the object. In other embodiments, the real-world dimensions that the cursor represents may be pre-determined, and the size of the cursor on the digital display may be scaled appropriately by the epipolar scale to accurately represent those predetermined dimensions. As a non-limiting example, the length of a cylindrical cursor may be predetermined to be one metre. One metre in a particular portion of the digital image may correspond to 100 pixels. If the cursor is superimposed over that particular portion of the digital image, the length of the cylindrical cursor will be 100 pixels. If the epipolar scale varies in other parts of the image, the cursor will be scaled accordingly when superimposed over those parts to accurately reflect its one metre length. The cursor may also be scaled to the last used scale where images of common proportions are processed.

In alternative embodiments, the digital image may be a cloud-of-points or have intrinsic dimensional information without the use of a scale. The cursor will then be scaled accordingly to the dimensional information contained within the digital image.

The skew of the cursor is at least partially determined by the perspective of the object to be measured when viewed from the perspective of the digital image. This allows the cursor to account for the perspective of the digital image when making measurements. As the cursor is superimposed over different portions of the digital image to measure the object, its skew accordingly changes to correspond to the perspective of the object to be measured in the digital image. This allows the cursor to accurately reflect constant heights, widths, or depths of objects which vary in different parts of the object. As a non-limiting example, if the cursor is a two-dimensional circle or ellipse used to indicate a constant height of a utility pole, the skew of the ellipse will change as the cursor is superimposed over different portions of the utility pole. This accurately represents the fact that the shape of a cross-section representing a constant height of a cylinder will be skewed depending on the perspective from which it is viewed.

Once the shape, size, and skew of the cursor has been at least partially determined, the cursor is superimposed over a portion of the image, as in step 36. The shape, size, and skew of the cursor may vary as it is superimposed over different portions of the image, as the scale and perspective of the image will vary the size and skew accordingly, as well as the shape of the object to be measured. Once the cursor is superimposed over the object or the portion of the object to be measured, the shape, size, or skew can be adjusted to match the shape, size, or skew of the object. This allows the operator to accurately adjust the overall dimensions of the cursor to accurately mark positions on the digital image and to take measurements.

Finally, the operator makes a measurement with the cursor, as in step 37. Making a measurement with the cursor may involve correlating the pixels that the cursor is superimposed over with the dimensional information associated with those pixels.

Figure 8A:
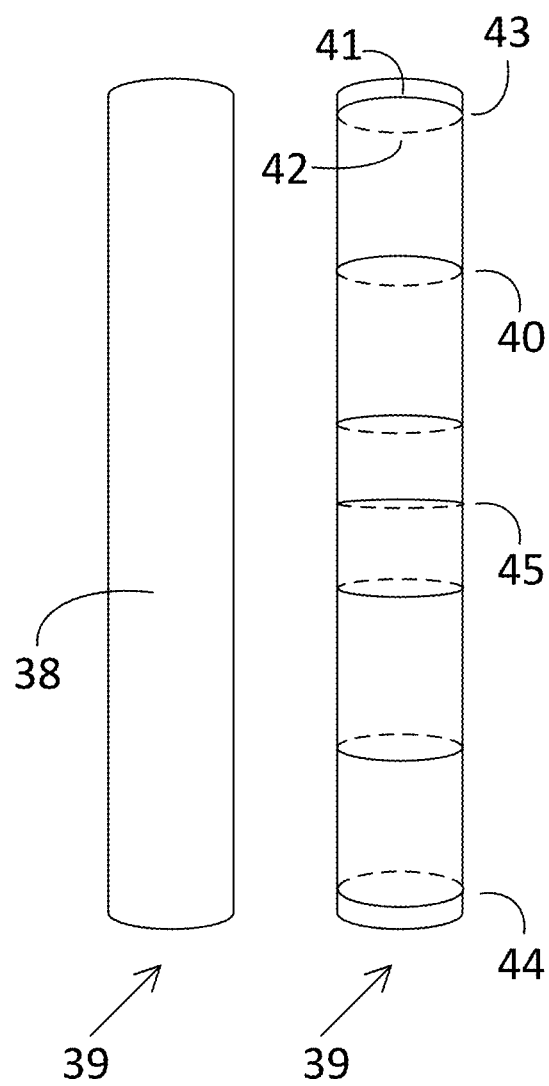
FIG. 8a shows a digital image of a cylindrical utility pole with a cross-sectional elliptical cursor representing a constant height.

An example of a parametric cursor is shown in FIG. 8a. A cylindrical utility pole 38 is displayed in a digital image 39. A two-dimensional elliptical cursor 40 is chosen to depict a cross-section representing a constant height on the utility pole, and its size is at least partially determined by a scale present in the digital image. A user may adjust the size of a cursor to match the object it is being fitted to. For example, a user may adjust the size of the cursor to match the diameter of the top of pole 38 (for example using a scroll wheel of a mouse) and align the cursor with the top of the pole and click to record the diameter and location of the top of the pole using information as to the cursor size and position.

In this embodiment, the elliptical cursor conveys the depth of at least a portion of the digital image which it is superimposed over. As a non-limiting illustration, the elliptical cursor is separated on the computer display or screen into a near edge 41, displayed with a solid line, and a far edge 42, displayed with a dotted or dashed line. This allows the operator to clearly and unambiguously visualise the constant height depicted by the cursor.

However, other embodiments of the cursor may represent the depth of a portion of the digital image of which they are superimposed through a variety of different ways. In some embodiments, the colour of the cursor may vary, and a two-colour scheme may be used to indicate the near and far edge. In other embodiments, multiple different colours may be used to indicate multiple depths, through the use of more than two colour-schemes or the use of a heatmap or colour gradient. In some embodiments, the colour of the edge of the cursor may vary, while in other embodiments, the colour of the area or volume of the cursor may alternatively or additionally vary. If the cursor represents a constant depth, the outline and/or area of the cursor may take a uniform colour which corresponds with a legend to represent a certain depth.

In yet further embodiments, the cursor may convey the depth of at least a portion of the digital image which it is superimposed through the use of grayscale, with a gradation representing a varying depth. In yet another embodiment, the opacity of the cursor may convey information about the depth of at least a portion of the image it is superimposed over, with the opacity of the cursor varying according to the depth of the portion of the image that it is superimposed over. In yet another embodiment, the cursor may convey information about the depth of the image by a change in the size, skew, and/or shape of the cursor, all of which may vary as the cursor is superimposed over different portions of the digital image. All of these examples are intended to be non-limiting, and any parametric cursor may employ any combination of the above methods to convey information about the depth of at least a portion of the image over which it is superimposed.

In the illustrative and non-limiting example depicted in FIG. 8a, the skew of the elliptical cursor 40 is adjusted to accurately represent a constant height cross-section after accounting for the perspective of the utility pole when viewed from the digital image as the cursor is shifted up and down the vertical axis of the utility pole. This leads to relatively wide cursors when the cursor is superimposed at positions 43 and 44, near the terminating ends of the utility pole, and a relatively narrow cursor when the cursor is superimposed over position 45, which is close to being at 'eye-level' from the perspective of the digital image.

Figure 8B:
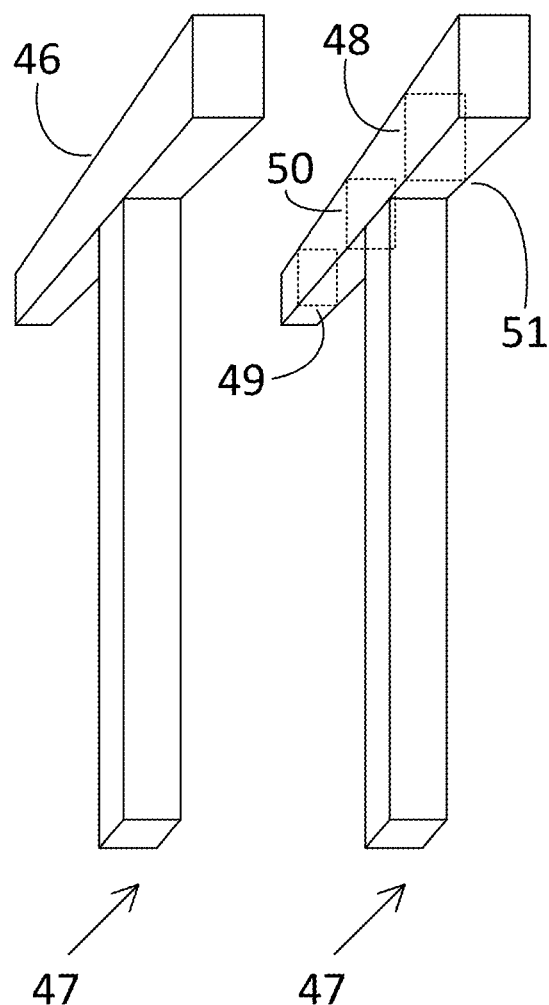
FIG. 8b shows a digital image of a cuboidal utility pole and cross-arm with a rectangular cursor representing a constant depth.

These embodiments of the invention may be useful in measuring the diameter at the top and bottom of a utility pole, attachment heights for transformers, cross-arms, guy wires, and/or lamps on a utility pole, A further example of a cursor used to indicate a constant cross-section is shown in FIG. 8b. A cuboidal cross-arm 46 is depicted on a digital image 47 which is displayed on a computer screen or display. In this non-limiting example, the shape of the cursor 48 is determined to be a two-dimensional rectangle to accurately depict a cross-section of the cross-arm. The size of the cursor is at least partially determined by the size of the cross-arm to be measured, as determined by the scale of the digital image. As the cursor is superimposed over various positions 49-51 of the cross-arm, the perspective of the digital image 47 is accounted for and the size of the rectangular cursor is reduced or enlarged to accurately represent the constant-area cross-section of the cross-arm. In this illustrative example, the skew and shape of the cursor remains the same, while the size is adjusted accordingly. However, those skilled in the art will realise that the present invention can allow for the shape, size, and skew of the cursor to continually vary as it is superimposed over different portions of the digital image or object to be measured to accurately represent a dimension to be measured after accounting for the perspective of the digital image and differing object profiles.

The operator may use the parametric cursor to make measurements of the object depicted in the digital image. It will be immediately apparent to those skilled in the art that a cursor representing a constant height, width, or depth through its shape, size, or skew offers a myriad of uses. As a non-limiting example, the locations and diameters of a cylindrical utility pole at its top and bottom can be easy ascertained by adjusting a cross-sectional elliptical cursor appropriately. It can then be determined whether the cross sections from the top and bottom of the utility pole are concentric about a common axis, and the lean of the utility pole can easily be inferred. A comparison of the top and bottom diameters, in conjunction with the spatial separation between the measured cross-sections of the utility pole, can be used to easily determine the taper of the utility pole.

Similarly, the cursors may aid the measurements of the thickness and length of a cross-arm, in addition to its attachment height.

Figure 9:
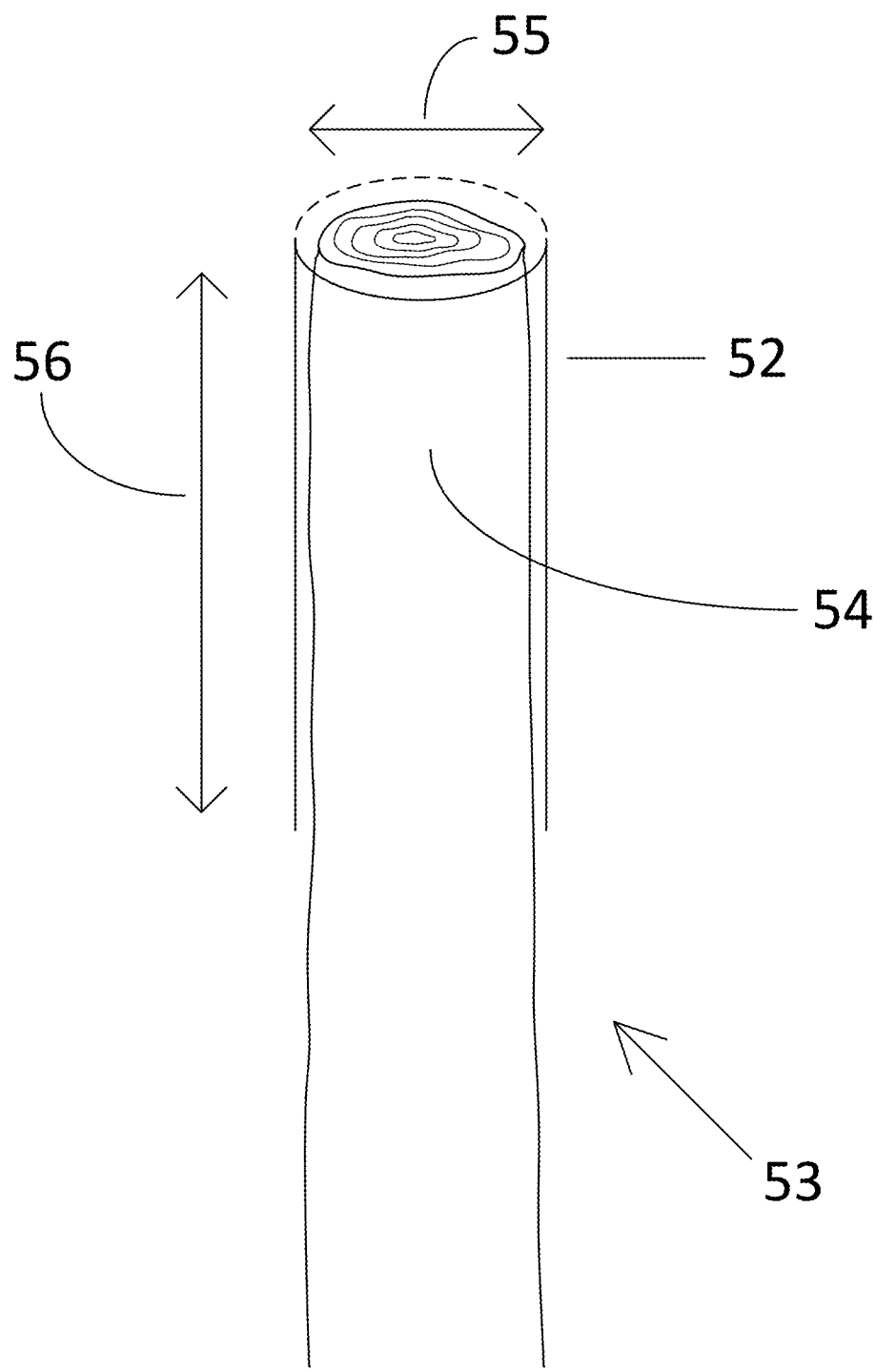
FIG. 9 shows a digital image of a utility pole with a cylindrical cursor superimposed over the image.

A further example of the use of parametric cursors is displayed in FIG. 9. In this depiction, a cylindrical cursor 52 is superimposed over a digital image 53 of a utility pole 54. The shape of the cursor 52 is chosen to coincide with the shape of the utility pole 54, and the size and skew of the cursor have been at least partially determined by the scale and perspective of the digital image 54. The cursor 52 is superimposed over the utility pole so that the axis of the utility pole is coaxial with the cursor, and the constant height represented by the terminating cap of the cylindrical cursor is superimposed over the terminating end of the utility pole. In this non-limiting example, the terminating cap of the cylindrical cursor is separated into a solid and dashed line to represent the near and far respective edge of the cross-section of constant height, to aid the operator in accurate measurements.

Once the cylindrical cursor 52 has been superimposed over the utility pole 54, the size, shape, and skew of the cursor is adjusted to properly coincide with the dimensions of the utility pole. The diameter 55 of the cylindrical cursor 52 can be adjusted after the cursor has been superimposed over the utility pole to accurately coincide with the diameter of the utility pole. This adjustment can be performed in an ergonomic way, such as adjusting a mouse scroll wheel of the associated computer. One aspect or dimension of the cursor—such as its shape, skew, and location—may be adjusted whilst the others remain fixed. This may be achieved by selecting an aspect or dimension to adjust (e.g.

by clicking a box in a GUI) and using a scroll wheel or mouse movement to adjust the selected aspect or dimension.

Similarly, the height 56 of the cursor 52 can be adjusted after the cursor has been superimposed over the utility pole to accurately coincide with the height of the utility pole. This adjustment may be performed ergonomically by the operator, such as using a mouse wheel or other intuitive input device. In some embodiments, the other aspects and dimensions may be fixed while the height of the cursor is adjusted.

In some embodiments, both the height 56 and diameter 55 of the cursor 52 may be adjusted simultaneously (such as by assigning the x axis movement of a mouse to height and y axis movement to width), while in other embodiments, one may be fixed (amongst other dimensions and aspects of the cursor) while the other dimension is adjusted accordingly. In some embodiments, the cursor may be fixed in a location of the digital image while the shape, size, or skew of the cursor is adjusted, while in other embodiments, the shape, size, or skew of the cursor may be adjusted without fixing the position of the cursor.

After the cursor 52 has been adjusted accordingly, the shape, size, and skew of the cursor is confirmed and a measurement of the object is made. This measurement requires the use of the dimensional information maintained with the digital image, such as the epipolar model of the object in the digital image, or the intrinsic information provided for by a cloud-of-points. In the embodiment depicted in FIG. 9, the cursor accurately allows for the measurement of the real-world diameter and height of the utility pole depicted in the digital image. Cursors such as those depicted in this particular embodiment may be useful in determining locations of utility poles, in addition to their height above ground, their taper, and their lean.

Figure 10:
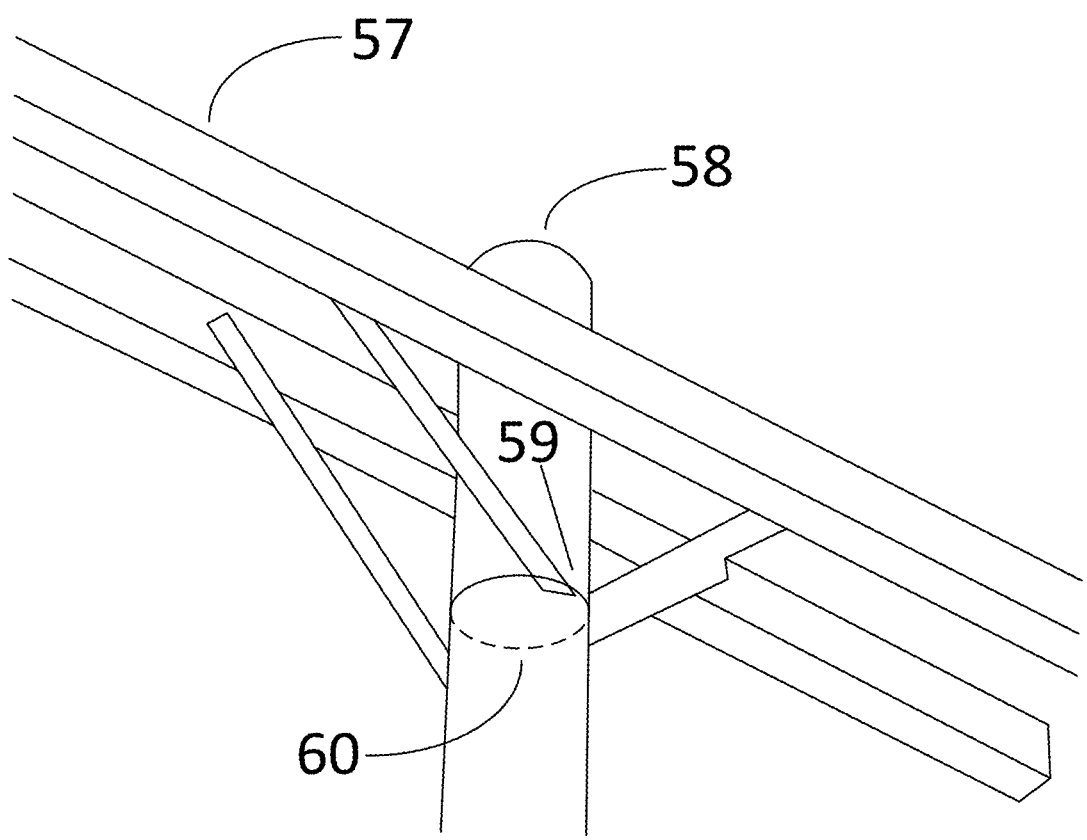
FIG. 10 shows an elliptical cursor measuring the attachment height of a cross-arm on a utility pole.

FIG. 10 depicts an example of the use of a cursor to determine the attachment height of a cross-arm. A cross-arm 57 is attached to a cylindrical utility pole 58 at an attachment point 59. The shape and size of the cursor 60 are at least partially determined by the shape and size of the utility pole which the cross-arm is attached to. In this case, as the cursor 60 is used to indicate the attachment point 59 of the cross-arm 57 to the utility pole 58, a two-dimensional elliptical cursor is used to represent a constant height along the utility pole. If a different geometry of utility pole were depicted, such as a cuboidal utility pole with rectangular faces, the cross-sectional cursor 60 may be a two-dimensional rectangle accordingly. However, the shape of the cursor 60 does not need to directly correspond to a cross-section of the three-dimensional geometry of the utility pole. A skewed rectangular cross-section can be used to accurately mark constant heights along cylindrical utility poles, and vice versa. The only requirement for the cursor is that it represents a plane of constant height, width, or depth from the perspective of the digital image.

Figure 11A:
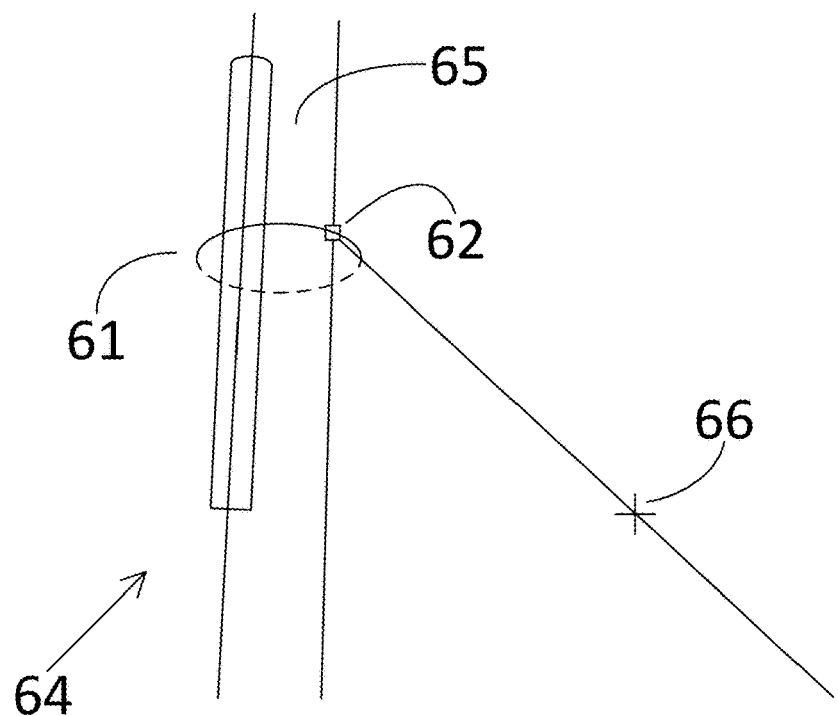
FIG. 11a depicts the use of an elliptical cursor to measure the attachment point of a guy wire on a utility pole.

After the position of the cursor 60 has been adjusted and it is accurately superimposed over the attachment point 59 of the utility pole 58, the operator makes a measurement by clicking the mouse or any other suitable input to the computer. The use of a cursor representing a constant height, width, or depth greatly assists in the accurate measurements of attachment points for hardware on utility poles. These cursors can assist measuring the attachment height or attachment point for a wide variety of hardware, including cross-arms, transformers, guy wires, and lamps, amongst other examples. FIG. 11a depicts the use of a similar cursor 61 in measuring an attachment point 62 of a guy wire 63 in a first digital image 64, and extrapolating information about the departure angle of the guy wire 63. The cursor again represents a constant height and a cross-section of the utility pole 65. The shape of the cursor 61 is elliptical, although its diameter is greater than the diameter of the utility pole 65 in this particular illustration. As the cursor 61 represents a plane of constant height from the perspective of the digital image 64, and the cursor 61 is used to mark the height of an attachment point 62, the boundaries of the edge of the cursor 61 need not be confined to the boundaries of the utility pole 65. If the cursor 61 was being used to accurately measure the diameter of the utility pole 65, the size, shape, and skew of the cursor would need to be adjusted accordingly.

Figure 11B:
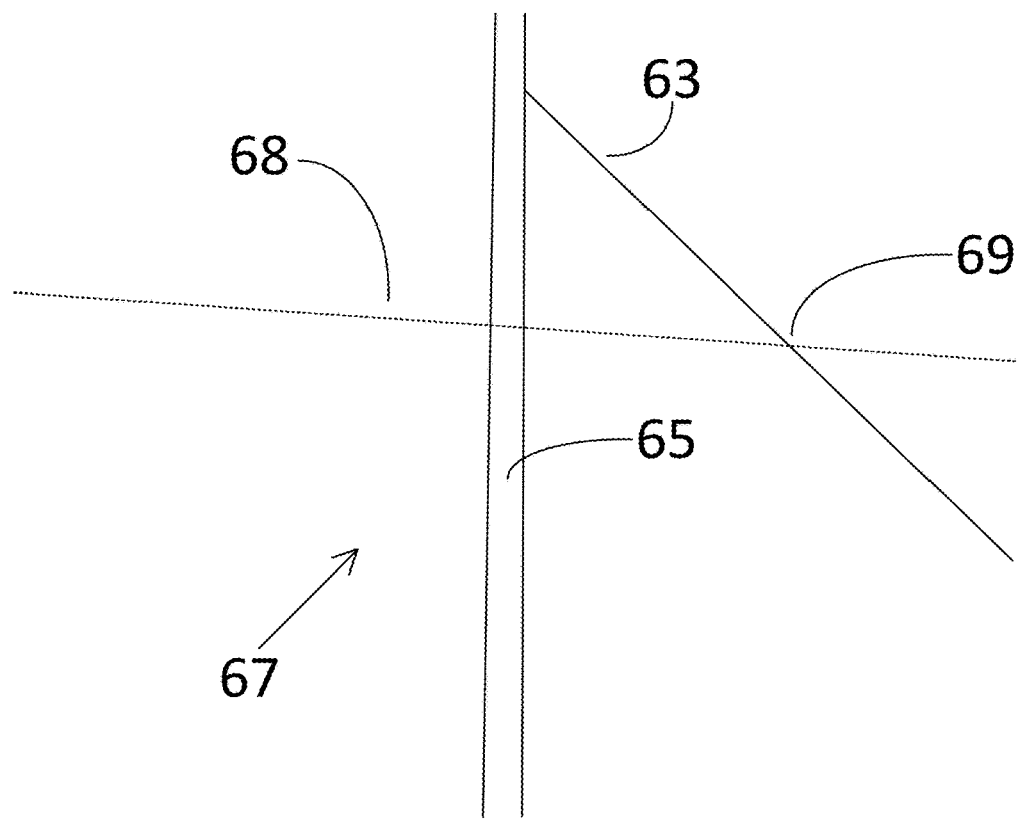
FIG. 11b depicts the extraction of key parameters of the guy wire using an epipolar geometry.

The cursor is first superimposed over the attachment point 62 of the guy wire 63 in the first digital image 64, and the height of the attachment point 62 on the utility pole 65 is measured by the operator. After the attachment height of the guy wire has been measured, a single point 66 along the guy wire is indicated by a secondary cursor in the shape of a cross. In the second digital image 67 of the utility pole 65 shown in FIG. 11b, the marked point 66 on the guy wire corresponds to an epipolar line 68, along which the same point 66 of the guy wire 63 must be constrained. The operator then marks where the guy wire 63 intersects 69 with the epipolar line 68 in the second digital image 67, constraining the guy wire 63 and establishing an epipolar model of the guy wire 63. The ground is assumed to be flat, and a line passing through the marked common point from the attachment point on the pole to the flat ground is extrapolated. The measurements of this extrapolated line provide the operator with the bearing or departure angle of the guy wire, the direction of the guy wire, the length to the ground of the guy wire, and the distance from the base of the utility pole to the intersection of the guy wire with the ground. The parametric cursors therefore assist in accurately measuring the key parameters of a guy wire in a robust and intuitive way.

Figure 12:
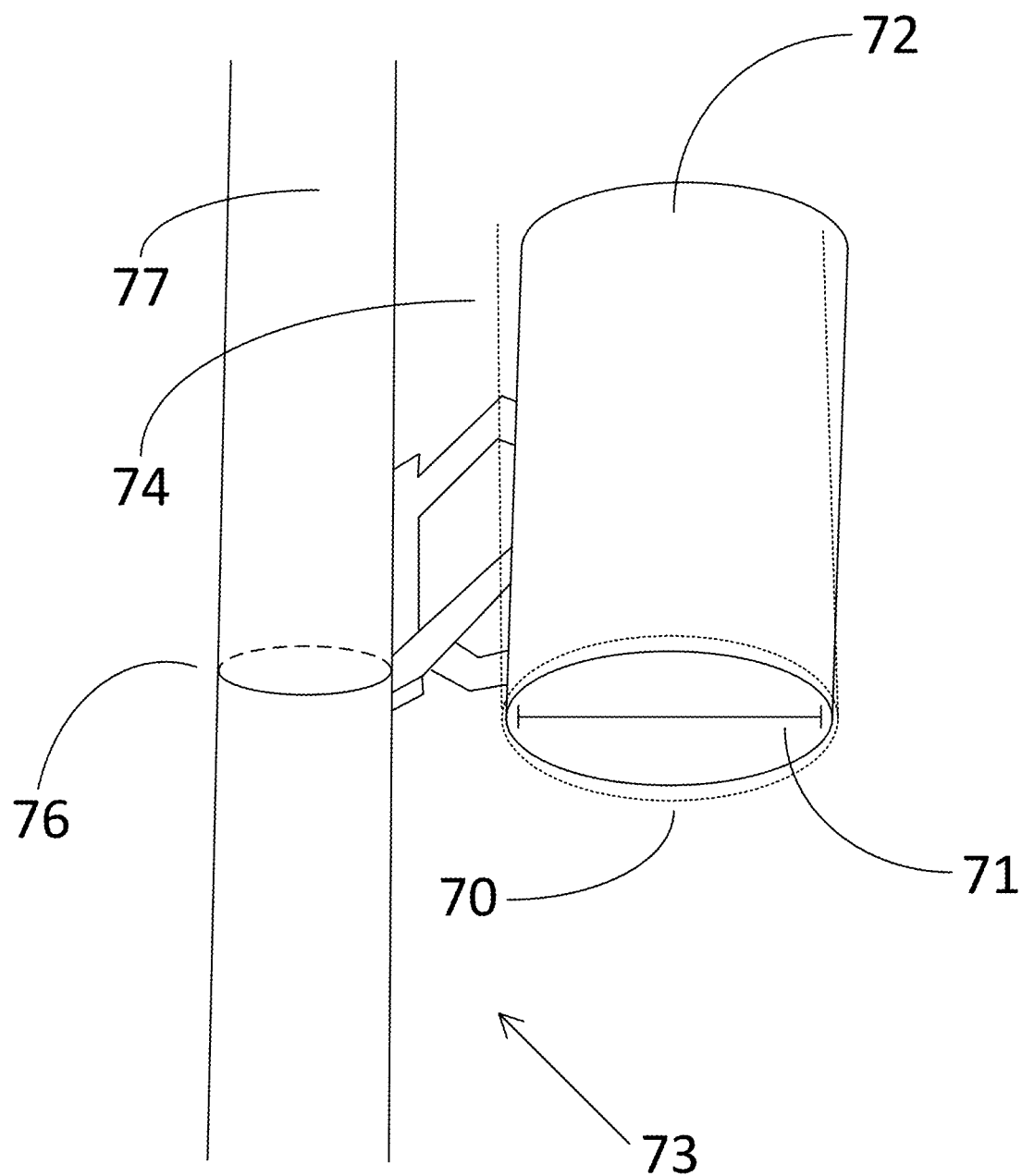
FIG. 12 shows an elliptical and cylindrical cursor used to extract the key parameters of a transformer installed on a utility pole.

FIG. 12 depicts an embodiment of a cursor used to measure the key characteristics of a cylindrical transformer. An elliptical cursor 70 is first used to accurately measure the base diameter 71 of the cylindrical transformer 72 in the first and second digital images (only one of which is shown here as 73.) After the diameter 71 is accurately measured, the cursor changes from a two-dimensional elliptical cursor to a three-dimensional cylindrical cursor 74 by extruding the height of the cylinder vertically from the two-dimensional ellipse 70. The height is adjusted until the cylindrical cursor is accurately superimposed over the transformer 72 before a measurement is made, yielding the height of the transformer 72. The cylindrical cursor 74 may be rotated within the digital image to accurately coincide with the transformer to determine the orientation and direction of the transformer. The attachment height 75 of the transformer 72 is then measured by using an elliptical cursor 76 of constant height on the utility pole 77. In this embodiment, the parametric cursor aids the operator in accurately measuring the diameter, size, direction, orientation, and attachment height of a transformer on a utility pole. It will be clear to the person skilled in the art that similar embodiments may be used to measure non-cylindrical transformers on non-cylindrical utility poles without departing from the spirit or scope of the disclosed invention.

Figure 13:
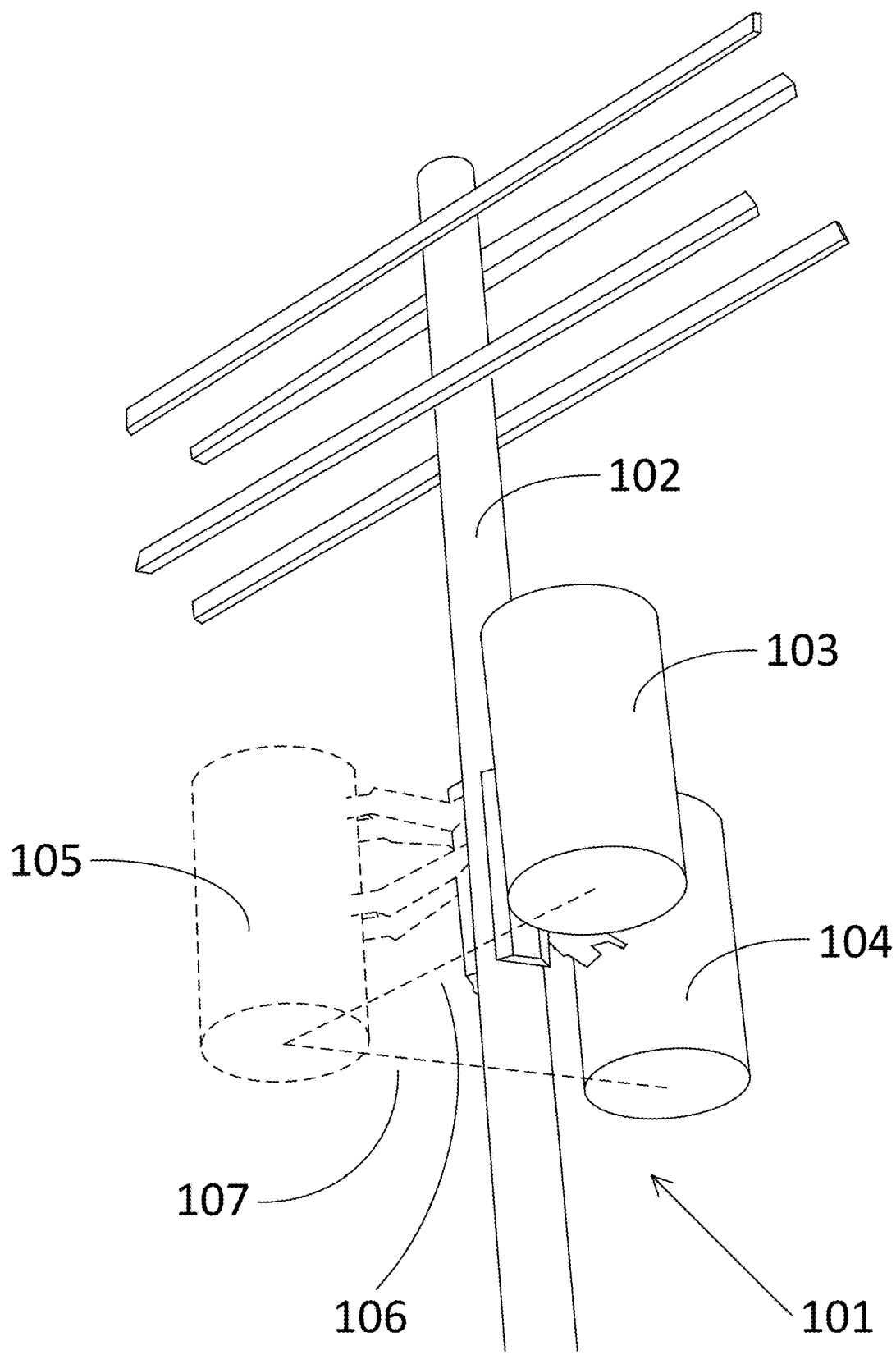
FIG. 13 shows a cursor used to visualise the position of an additional transformer on an existing utility pole.

The parametric cursors used to make measurements on images may also be used to visually determine how additional utility pole hardware components might be placed on the utility pole. In particular, this may be used to determine whether adding an additional component would result in the utility pole not complying with relevant rules or regulations. FIG. 13 illustrates an embodiment of a parametric cursor being used to visualise the placement of an additional transformer onto a utility pole. A digital image 101 of a utility pole 102 is displayed on a computer screen or display. In this non-limiting example, the utility pole 102 is equipped with existing transformers 103 and 104. A parametric cursor 105 in the shape of a transformer is superimposed over the utility pole 102. The parametric cursor 105 has been scaled to represent real-world dimensions from the perspective of the digital image, and allows the operator to visually determine whether including an additional transformer would render the utility pole 102 non-compliant.

In some embodiments, the use of the parametric cursor 105 to determine compliance of additional hardware may involve computations or simulations of the dimensions of the additional hardware. In addition to providing a visual check, the parametric cursor may account for the dimensions of the existing utility pole hardware and determine whether the additional hardware would be in compliance or not. As a non-limiting example, the coordinate position of the parametric cursor 105 may be compared with the existing transformers 103 and 104, and the separation between 106 and 107 them may be compared with a minimum separation. If the transformer represented by the parametric cursor 105 is too close to the existing transformers 103 and 104, the operator may be informed that the placement of the transformer would not be in compliance. In some embodiments, the operator may not be allowed to place the parametric cursor in areas where the corresponding transformer would not comply. In some embodiments, the areas on the utility pole 102 where the placement of the corresponding transformer would comply may be highlighted to the operator. In other embodiments, the operator may be informed as to what class of transformers would or would not comply in a given location on the utility pole 102 where the parametric cursor 105 is superimposed over.

Although the above example is given within the context of transformers, this is not intended to be limiting. It will be apparent to the person skilled in the art that a similar approach could be taken with a wide range of utility pole hardware, including cross-arms, guy wires, lamps, and insulators, amongst other hardware components or modules. Similarly, the metric used to determine compliance may not be restricted to spatial proximity between hardware components, and may include metrics such as departure angles, lengths, sizes, volumes, and pole classifications, amongst many other such metrics.

Typically, utility poles are classified into different groups or classes depending on their dimensions and loading capabilities. As photogrammetric measurements of a utility pole's dimensions are made, the likelihood that it belongs to a given class can be estimated. As more information is photogrammetrically derived from the utility pole, the range of classes it could possibly belong to is progressively narrowed, and the most likely class it belongs to is predicted with a greater certainty. Estimating the likelihood that a utility pole belongs to one or more classes can provide a photogrammetric operator with valuable information that can supplement photogrammetric measurements.

Figure 14:
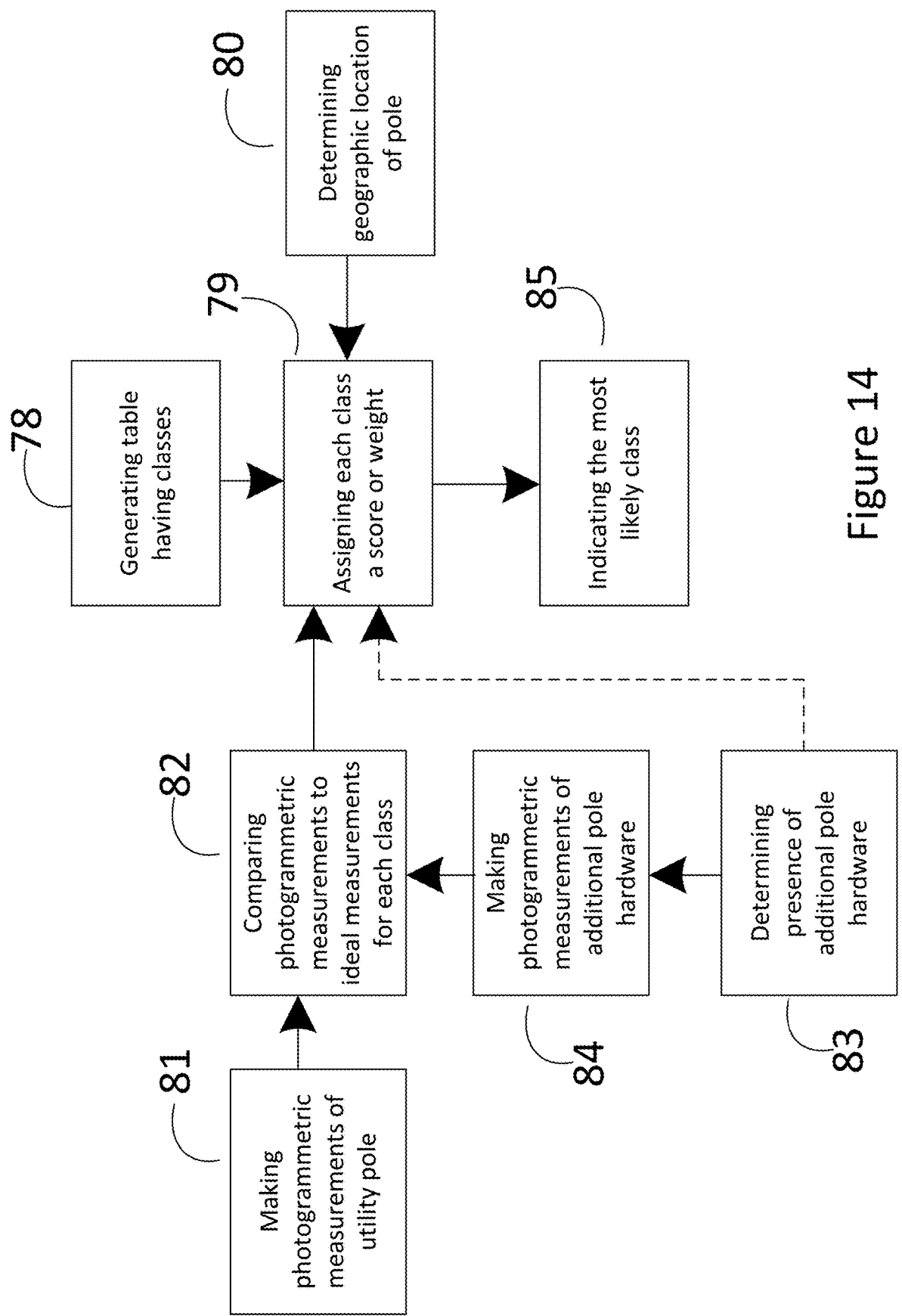
FIG. 14 is a flowchart depicting a method of determining the likelihood that a utility pole belongs to a certain class of utility poles.

FIG. 14 depicts a method for indicating the likelihood that a utility pole is classified as one or more classes. In step 78, a table is generated which includes a plurality of classes which the utility pole could be classified as. In some embodiments, the classes included in the table may be at least partially determined by the geographic location of the utility pole. Utility pole classes may not be standardised around the world, and different countries may use different classification regimes. The table of possible classes can account for this fact by taking the location of the utility pole into consideration, and may only include classes are used within the general area of the utility pole. In other embodiments, the table may not take the geographical location of the utility pole into consideration. These embodiments may be useful when the geographical location of the utility pole is not known. In some further embodiments, the table may be generated with an exhaustive list of classes by referring to a database or collection of possible classes that occur world-wide.

Each generated class within the table of classes is assigned a score or weight which reflects the likelihood that the utility pole belongs to that class, as in step 79. The score or weight which is assigned to each class is partially determined by a number of factors. In some embodiments, the geographic location of the utility pole is used to at least partially determine the score or weight assigned to each class within the generated table, as in step 80. These embodiments are particularly useful when the table includes a number of classes which are specific to certain locations or countries. Alternatively, these embodiments may be useful in areas where certain classes of utility poles are more likely to be present than others.

Measurements or characteristics of the utility pole derived using photogrammetry are also used to at least partially determine the score or weight assigned to each class within the table, shown in step 81. In some embodiments, the photogrammetric measurements or characteristics of the utility pole may be directly compared to ideal or representative dimensions which define each class of utility pole, as in step 82. In these embodiments, the photogrammetric measurements or characteristics are compared with ideal or representative measurements for each of the classes included within the table, and the score or weight assigned to that class is at least partially determined by the comparison.

Those skilled in the art will recognise the wide variety of measurements or characteristics which could be photogrammetrically derived from a utility pole to assist in determining its most likely classification. As a non-limiting example, these measurements could include the embedment of the utility pole, the height of the utility pole, the circumference of the utility pole at the bottom, top, or elsewhere on the utility pole, or the taper of the utility pole. Any combination of any photogrammetrically-derived measurements of the utility pole may be used to at least partially determine the score or weight assigned to each class in the generated table. Additionally, the process of at least partially determining the score or weight assigned to each class using photogrammetric measurements may be iterative. As further measurements of the utility pole are made, the score or weight assigned to each class may be updated to reflect the additional information about the utility pole.

In some embodiments, the characteristics of the utility pole derived from the digital images of the utility pole may include measurements which are not measured dimensions. As a non-limiting example, the derived characteristic of the utility pole may be the material that the utility pole is at least formed from. In some embodiments, the material may be manually identified by the operator by inspecting the digital image. In other embodiments, the material may be identified by using image analysis techniques known in the art, including standard machine vision and machine learning techniques to analyse textures of material, etc.

In some embodiments, the measurement or characteristic photogrammetrically derived from the utility pole may be the presence of additional hardware on the utility pole, or measurements of the additional hardware, as in steps 83 and 84. The presence of additional pole hardware on a utility pole, or photogrammetric measurements of the utility pole hardware, may at least partially determine the score or weight assigned to each class in the table. In some embodiments, certain classes of utility poles included in the generated table may be categorically incompatible with certain types of pole hardware, and the presence of those types of pole hardware on the utility pole being measured can at least partially determine the score or weight assigned to those classes. In other embodiments, certain classes of utility poles included in the generated table may be compatible only with pole hardware having certain dimensions, and photogrammetric measurements of the pole hardware may at least partially determine the score or weight assigned to each of those classes. In some further embodiments, the photogrammetric measurements of the pole hardware may be compared to ideal or representative measurements of pole hardware, as in step 82.

In some embodiments, the score or weight assigned to each class may represent a probability. For example, the score or weight may represent a percentage of likelihood, with 100% being the maximum likelihood, and 0% being the minimum likelihood. In other embodiments, the score or weight assigned to each class may represent the probability that the utility pole belongs in the class, but may not be a percentage. For example, the score may not be capped at 100, and the process of finding the most likely class may involve determining which class has been awarded the maximum score.

In other embodiments, the score or weight assigned to each class may be categorical, e.g. 'possible' or 'not possible'. This categorical score or weight may also be represented numerically. As a non-limiting example, the classes which are 'possible' may be assigned a 1, while the classes which are 'not possible' may be assigned a 0. As the dimensions of the utility pole are consequently made, the scores and weights may be iteratively updated until only one or a few classes are deemed 'possible' through process of elimination.

In yet a further embodiment, the score or weight assigned to each class may represent a total error or deviation from the measured utility pole. The process of finding the most likely class may involve identifying the class which has the lowest error or score or weight assigned to it. In yet a further embodiment, the score or weight may involve a combination of the above metrics, either separately and in parallel or as a single combined score or weight. Those skilled in the art will recognise the various ways in which the score or weight used to determine the likelihood of the utility pole falling into a given class may be defined.

After the score or weight assigned to each class has been at least partially determined, the likelihood that the utility pole is classified as one or more classes based on the scores or weights assigned to each class is indicated, shown in step 85. This indication may be iteratively updated as further photogrammetric measurements of the utility pole are made, and new information is provided to help at least partially determine the score or weight assigned to each class in the table. In some embodiments, this indication may be a presented to the operator on a graphical table on a computer screen or display. In some embodiments, the graphical table may be coloured according to a heatmap or other scheme to allow the operator to quickly ascertain the likelihood of each classification. In other embodiments, the graphical table may be coloured using different shades of a one or more colours, which a gradation in shade representing a different likelihood. In still other embodiments, the indication of the likelihood that the utility pole belongs to each class may be presented textually to the operator. In yet another further embodiment, the most likely class the utility pole belongs to may additionally be indicated to the operator. When used in an automated system the class may be determined based on probability information.

Figure 15:
FIG. 15 depicts the comparison between a set of photogrammetric measurements and ideal measurements representing known classes.

FIG. 15 illustrates a non-limiting example of photogrammetric measurements and characteristics being compared to ideal or representative measurement of different possible classes. The measured dimensions and characteristics 86 in this non-limiting example include the circumference at the top of the utility pole, the length of the utility pole, the circumference 6 feet from the butt of the pole, and the material the pole is formed from. In some embodiments, each measured dimension or characteristic 86 may be individually compared to ideal or representative measurements from each class 87-90, and the score or weight assigned to that class may be at least partially determined by a sum of those individual comparisons. In other embodiments, the comparison between the measured and representative dimensions or characteristics may involve a single comparison between all measured and all representative dimensions or characteristics, and the score or weight assigned to each class may be at least partially determined by that single comparison.

Furthermore, the comparison between the photogrammetric measurements or characteristics and the ideal or representative measurements may involve a tolerance or padding in some embodiments. As a non-limiting example, the measurement may be given a certain percentage of tolerance, and may be considered to fall within the ideal or representative measurement if the ideal or representative measurement is within that percentage. In other embodiments, the measurement may be assigned a fixed tolerance which is not a percentage, and may be considered to fall within the ideal or representative measurement if the ideal or representative measurement is within the measurement plus or minus the fixed tolerance. In either embodiment, the tolerance may be used in addition to or subtraction from the measurement. In other embodiments, the tolerance may only be added to the measurement, or only subtracted from the measurement. These embodiments may be useful where, for example, subtracting a tolerance results in a negative or non-physical measurement. The various ways in which a tolerance can be applied or utilised will be readily apparent to those skilled in the art.

In some embodiments, the comparison between the photogrammetrically-derived measurements or characteristics with the ideal measurements or characteristics representing each class may be graphically displayed to the operator, such as a graphical table on a computer screen or display. In other embodiments, the comparison may be performed internally by a computer, and the comparison may not be graphically displayed to the operator.

Figure 16:
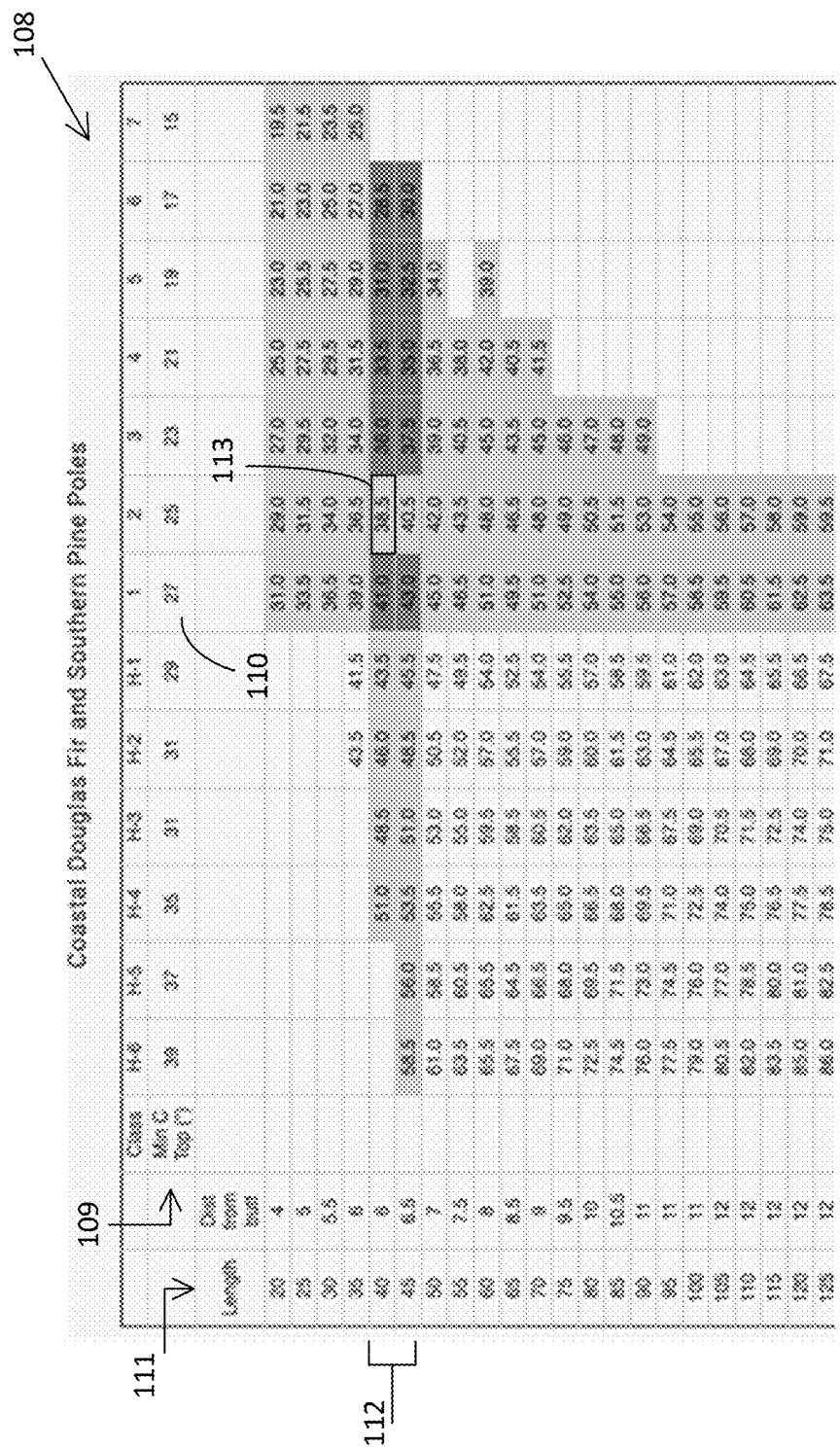
FIG. 16 is a table indicating the likelihood that a utility pole belongs to a set of classes.

FIG. 16 shows one embodiment of a graphical table indicating the likelihood that a utility pole is classified as one or more classes based on the scores or weights assigned to each class. In this non-limiting example, different shades are used to indicate the likelihood of each class, and the most likely class is displayed in the lightest shade of green. The table representing each possible class is displayed as 108. Ideal measurements corresponding to the measured circumference at the top of the utility pole are displayed in the row indicated by 109. The circumference at the top of the utility pole (not depicted) has been measured to be no larger than 27 inches, rendering everything smaller than 27 inches as potentially possible. This is depicted by the shading rightwards of cell 110. Corresponding ideal length measurements are displayed in column 111. The photogrammetrically measured length of the utility pole (not pictured) has restricted the possible pole to the two rows indicated by 112. A third measurement, the circumference of the utility pole 6 feet from the butt, gives a third axis which restricts the possible classes which the pole can be classified as. Taking the intersection of the columns rightwards of 110, along with the two rows indicated by 112, and the third dimension (not pictured) representing the measured circumference of the utility pole 6 feet from the butt, yields the possible pole length/class highlighted in cell 113. This cell has been colour-coded to represent the likelihood of the correct classification.

Photogrammetric measurements of a utility pole are also useful in determining its compliance status. Utility poles are rated for certain loading limits or certain applications by governments or other regulatory bodies, and these loading limits are typically estimated by the dimensions and construction of a utility pole or its associated hardware. Additionally, there are typically rules and regulations dictating, for example, how closely spaced wires can be from one another on the utility pole. The dimensions of utility poles and their associated hardware, and the spacing and geometric relationship between pole or hardware components, can be determined photogrammetrically. An operator can therefore determine the compliance status of a utility pole or its hardware while also making photogrammetric measurements of their dimensions.

Figure 17:
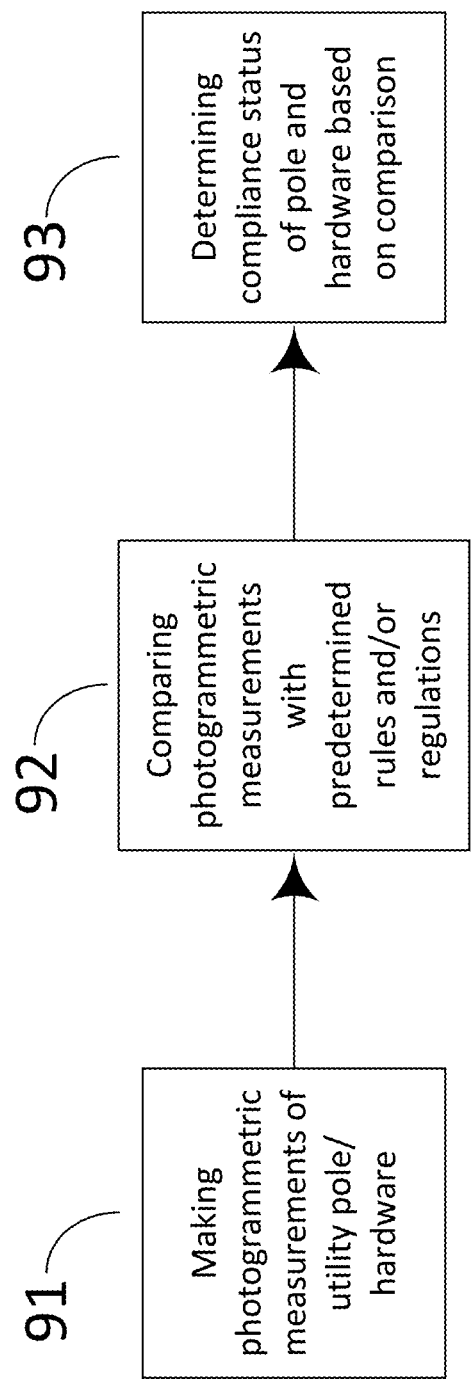
FIG. 17 is a flowchart depicting a method of determining the compliance of a utility pole by comparing a set of photogrammetric measurements to a predetermined set of rules and/or regulations.

FIG. 17 depicts a computer-implemented method for determining the compliance status of a utility pole and/or associated hardware. After an epipolar model of a utility pole has been derived, photogrammetric measurements of a utility pole or pole hardware are made in step 91. It will be apparent to those skilled in the art that a wide variety of pole hardware can be measured to assist in determining the compliance status of a utility pole. As a non-exhaustive list, the associated pole hardware may include transformers, guy wires, cross-arms, lamps, or high-voltage wires. Similarly, it will be immediately apparent to those skilled in the art that many different dimensions of the associated pole hardware can be measured, including diameters, lengths, thicknesses, volumes, and distances between components.

Once photogrammetric measurements have been made of the utility pole and/or any associated hardware, the photogrammetric measurements are compared with a predetermined set of rules and/or regulations, as in step 92. These predetermined rules or regulations define whether a utility pole or its associated hardware is in compliance or not. Those familiar with the rules and regulations which typically dictate whether a utility pole and associated hardware is in compliance or not will recognise that the rules and regulations can include many criteria and category used to determine compliance. Without limitation, these criteria may include the loading capabilities of a utility pole, a spacing between high voltage wires, a spacing between communication wires, or a guy wire departure angle in some embodiments of the invention.

In some embodiments, the predetermined rules or regulations may be at least partially determined by the geographic location of the utility pole or associated hardware being measured. This may reflect the fact that rules and regulations dictating whether a utility pole is in compliance or not are not uniform across different countries or municipalities. In other embodiments, the rules or regulations used to determine compliance may be custom defined by the operator or another party, and may not need to account for the rules or regulations used specifically within the geographic location or area of the utility pole or associated hardware.

In some embodiments, the comparison of the photogrammetric measurements with the predetermined set of rules and/or regulations may include checking whether the measurements are greater than or less than a threshold which is defined by the predetermined rules or regulations. As a non-limiting example, the rules or regulations may specify a safe spacing threshold between high-voltage wires. If the measured spacing between two high-voltage wires does not meet the safe spacing threshold established by the predetermined rules or regulations, the utility pole may fail compliance. In other embodiments, the comparison between the photogrammetric measurements with the predetermined rules and/or regulations may include checking whether the photogrammetric measurements fall inside or outside of a certain range determined by the rules or regulations. As a non-limiting example, the predetermined rules or regulations may establish a certain safe range of guy wire departure angles from the utility pole. If a guy wire departs from an angle that falls outside of this safe range, the utility pole may fail compliance.

The compliance status is then determined based on the comparison between the photogrammetric measurements with the predetermined rules and regulations, as depicted in step 93. In some embodiments, failure to comply with the predetermined rules or regulations may be categorical, and if a single aspect of the utility pole is found to be inadequate, the entire utility pole fails to comply. In other embodiments, the failure to comply with the predetermined rules or regulations may be cumulative, and a certain number of aspects of the utility pole may need to be found inadequate before the utility pole is found to not comply.

In some embodiments, in the event that a utility pole or associated hardware is found to not comply, a party may be alerted to the non-compliance of the utility pole or associated hardware. These parties may include the photogrammetry operator or the utility pole/hardware owner or operator. In some embodiments, the alert may be presented to the photogrammetry operator or other party graphically on a computer screen or display. In other embodiments, the alert may be sent to the photogrammetry operator or other party through email, SMS, or some other textual means. Those skilled in the art will recognise the wide variety of ways that a party could be alerted to the non-compliance of a utility pole or associated hardware.

Figure 18:
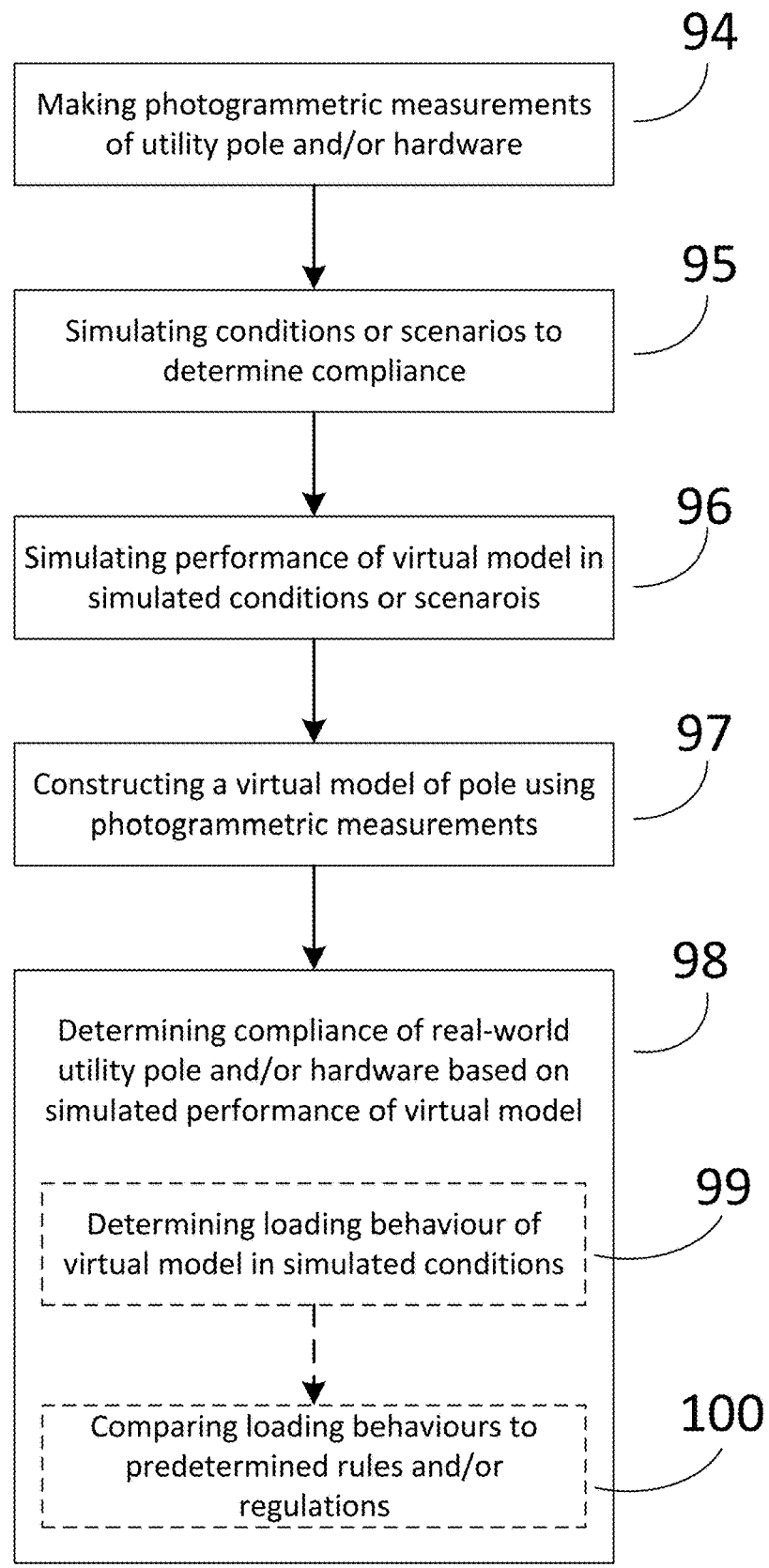
FIG. 18 is a flowchart depicting a method of determining the compliance status of a utility pole by constructing a virtual model of the utility pole using photogrammetric measurements and simulating the behaviour of the virtual model in simulated scenarios and conditions.

An additional computer-implemented method for determining the compliance status of a utility pole and/or associated hardware is shown in FIG. 18. Digital images are taken of a utility pole and its associated hardware, and an epipolar model of the utility pole is established. Photogrammetric measurements of the utility pole and its associated hardware are made by an operator, shown in step 94, and aspects of the utility pole may be photogrammetrically derived. As a non-limiting example, these photogrammetric measurements or photogrammetrically derived aspects can include measured physical dimensions, a count or number of a given type of hardware modules, and classes of the utility pole or associated pole hardware.

When a sufficient number of photogrammetric measurements have been taken of the utility pole and its associated hardware, a virtual model of the measured utility pole is constructed using the acquired photogrammetric measurements, as in step 95. The minimum number and type of photogrammetric measurements needed to construct a virtual model will depend on the utility pole and its associated hardware in each instance. The key parameters of the utility pole and its associated hardware may need to be photogrammetrically measured to construct an accurate model. In some embodiments, the virtual model may be a 3D or CAD model constructed using techniques known to the person skilled in the art.

Having constructed a virtual model of the utility pole and/or its associated hardware, at least some of the conditions or scenarios used to determine the compliance status of the utility pole or hardware are simulated, as in step 96. After the conditions used to determine the compliance status of the utility pole or associated hardware have been simulated, the performance of the virtual model in those conditions is in turn simulated, as in step 97. Simulating the performance of the utility pole in conditions or scenarios used to determine its compliance may offer a reliable and relatively inexpensive method of determining compliance without subjecting the utility pole to real-world tests, or using the utility pole without an assurance of safety. In some embodiments, the utility pole's performance may be determined in simulated weather conditions. In some further embodiments, these simulated weather conditions can include high winds and/or icy conditions which are used to stress the loading capability of the simulated utility pole.

Based on the simulated behaviour of the virtual model of the utility pole and/or associated hardware in the simulated conditions, the compliance status of the real-world utility pole is determined, as in step 98. In some embodiments, this may include determining the loading behaviour of the virtual model of the utility pole in the conditions simulated in step 99. In still further embodiments, the loading behaviour of the virtual model may be compared to a predetermined set of rules and/or regulations which determine whether a utility pole is in compliance or not, as in step 100. These predetermined rules or regulations may be chosen to represent the rules and regulations of the geographical area where the utility pole is located.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of photogrammetrically measuring a structure, the method comprising:
   acquiring an azimuth reading and a tilt reading at a first location;
   acquiring a first digital image of the structure from the first location;
   using a distance measuring device to measure a distance from the first location to a first point on the structure;
   acquiring an azimuth reading and a tilt reading at a second location;
   acquiring a second digital image of the structure from the second location;
   using a distance measuring device to measure a distance from the second location to a second point on the structure;
   establishing a scale using at least one of:
      the first digital image and the distance measured from the first location to the first point on the structure; and
      the second digital image and the distance measured from the second location to the second point on the structure;
   determining the distance between the first point on the structure and the second point on the structure using the established scale; and
   establishing a baseline between the first location and the second location to derive an epipolar model of the structure using:
      the determined distance between the first point on the structure and the second point on the structure,
      the distance measured from the first location to the first point on the structure,
      the azimuth reading and tilt reading acquired at the first location,
      the distance measured from the second location to the second point on the structure, and
      the azimuth reading and tilt reading acquired at the second location.

2. The method of claim 1, wherein the digital image, azimuth reading, and tilt reading at either the first or second location are acquired substantially simultaneously.

3. The method of claim 1, wherein the structure is a utility pole.

4. The method of claim 1, wherein each digital image and associated readings are acquired using a single apparatus.

5. The method of claim 1, wherein the absolute difference between the azimuth readings acquired from the first and second locations is 50° to 130°.

6. The method of claim 1, wherein establishing the scale includes determining the vertical height of the structure by using the angular separation between the top and bottom of the structure in the first and/or second digital image in conjunction with the distance measured from the first and/or second location to the first and/or second point on the structure, respectively.

7. The method of claim 6, wherein the angular separation between the top and bottom of the structure is determined by the number of pixels between said top and bottom in said first and/or second digital image.

8. The method of claim 1, wherein the method further includes:
   photogrammetrically measuring said structure using said epipolar model to produce measurements, wherein said structure is a utility pole and/or hardware associated with a utility pole;
   comparing said measurements of said utility pole and/or associated hardware with a predetermined set of rules and/or regulations; and
   determining the compliance status of said utility pole and/or associated hardware based on said comparison between said measurements and said rules and/or regulations.

9. The method of claim 1, wherein the method further includes:
   photogrammetrically measuring said structure using said epipolar model to produce measurements, wherein said structure is a utility pole and/or hardware associated with a utility pole;
   constructing a virtual model of said utility pole and/or associated hardware using said measurements;
   simulating at least some of the conditions or scenarios used to determine the compliance status of a utility pole and/or associated hardware;

simulating the behaviour of said virtual model in said simulated conditions or scenarios; and determining the compliance status of said utility pole and/or associated hardware based on said simulated behaviour of said virtual model in said simulated conditions.

10. The method of claim 1, wherein the method further includes:

measuring a position of a surface of said structure in a geographic coordinate system; and applying one or more offsets to said measured position.

* * * * *